(12) United States Patent
Zhang et al.

(10) Patent No.: US 12,184,585 B2
(45) Date of Patent: Dec. 31, 2024

(54) METHOD AND APPARATUS FOR TRANSMITTING AND RECEIVING UPLINK DATA AND CONTROL INFORMATION

(71) Applicant: Samsung Electronics Co., Ltd., Suwon-si (KR)

(72) Inventors: Sa Zhang, Beijing (CN); Yi Wang, Beijing (CN); Jingxing Fu, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 321 days.

(21) Appl. No.: 17/709,970

(22) Filed: Mar. 31, 2022

(65) Prior Publication Data

US 2022/0329390 A1  Oct. 13, 2022

(30) Foreign Application Priority Data

Apr. 2, 2021 (CN) .......................... 202110359918.5
Mar. 18, 2022 (CN) .......................... 202210273251.1

(51) Int. Cl.
*H04L 5/00* (2006.01)
*H04L 1/1812* (2023.01)

(52) U.S. Cl.
CPC .......... *H04L 5/0055* (2013.01); *H04L 1/1812* (2013.01)

(58) Field of Classification Search
CPC ... H04L 5/0055; H04L 1/1812; H04L 1/1671; H04L 1/1854; H04L 1/1822;
(Continued)

(56) References Cited

U.S. PATENT DOCUMENTS

2018/0152274 A1   5/2018  Li et al.
2020/0351032 A1*  11/2020  Wu ...................... H04W 72/20
(Continued)

FOREIGN PATENT DOCUMENTS

CN    101605024 B  *  1/2013
CN    110622598 A  *  12/2019  ........... H04L 1/1812
(Continued)

OTHER PUBLICATIONS

International Search Report dated Jun. 24, 2022, issued in an International Application No. PCT/KR2022/004612.
(Continued)

*Primary Examiner* — Jay P Patel
(74) *Attorney, Agent, or Firm* — Jefferson IP Law, LLP

(57) ABSTRACT

The disclosure relates to a $5^{th}$ generation (5G) or $6^{th}$ generation (6G) communication system for supporting a higher data transmission rate. A method performed by a terminal is provided. The method includes receiving, from a base station, a radio resource control (RRC) message including first configuration information for a hybrid automatic repeat request (HARQ)-acknowledgement (ACK) feedback mode related to a multicast physical downlink shared channel (PDSCH) and second configuration information for a physical uplink control channel (PUCCH) resource set related to the HARQ-ACK feedback mode, receiving, from the base station, the multicast PDSCH, and transmitting, to the base station, HARQ-ACK information for the multicast PDSCH based on the first configuration information and the second configuration information.

20 Claims, 13 Drawing Sheets

(58) Field of Classification Search
CPC ........... H04L 1/1864; H04L 2001/0093; H04L 5/0044; H04L 5/0094
See application file for complete search history.

(56) References Cited

U.S. PATENT DOCUMENTS

| | | | | |
|---|---|---|---|---|
| 2021/0028891 | A1* | 1/2021 | Zhou | H04W 4/40 |
| 2021/0250905 | A1* | 8/2021 | Liu | H04L 1/1861 |
| 2022/0256625 | A1* | 8/2022 | Park | H04W 52/02 |
| 2022/0360950 | A1* | 11/2022 | Li | H04L 1/1812 |
| 2023/0046231 | A1* | 2/2023 | Dimou | H04L 1/1861 |
| 2023/0083277 | A1* | 3/2023 | Lee | H04W 72/0446 370/329 |
| 2023/0104340 | A1* | 4/2023 | Park | H04L 69/28 370/329 |
| 2023/0115633 | A1* | 4/2023 | Park | H04W 72/0446 370/311 |
| 2024/0015767 | A1* | 1/2024 | Back | H04W 52/0225 |

FOREIGN PATENT DOCUMENTS

| | | | | |
|---|---|---|---|---|
| CN | 112312351 A | * | 2/2021 | ........... H04L 1/1607 |
| CN | 113708898 A | * | 11/2021 | |
| CN | 115633401 A | * | 1/2023 | ........... H04L 1/1812 |
| CN | 115189819 B | * | 11/2023 | ............... H04L 1/16 |
| WO | WO-2021197122 A1 | * | 10/2021 | ........... H04L 1/1825 |

OTHER PUBLICATIONS

Intel Corporation, 'NR MBS Group Scheduling for RRC_CONNECTED UEs', R1-2100674, 3GPP TSG RAN WG1 #104-e, e-Meeting, Jan. 19, 2021.
Moderator (Huawei), 'FL summary#5 on improving reliability for MBS for RRC_CONNECTED UEs', R1-2102134, 3GPP TSG RAN WG1 Meeting #104-e, E-meeting, Feb. 5, 2021.
Lenovo et al., 'Discussion on reliability improvement for RRC-CONNECTED UEs', R1-2100769, 3GPP TSG RAN WG1 #104-e, E-meeting, Jan. 18, 2021.
Mediatek Inc., 'Discussion on HARQ operation for NR MBS reliable transmission', R1-2100614, 3GPP TSG RAN WG1 #104-e, e-Meeting, Jan. 19, 2021.
Intel Corporation, Mechanisms to Improve Reliability of NR MBS for RRC_CONNECTED UEs, R1-2100675, 3GPP TSG RAN WG1 #104-e, Jan. 19, 2021, e-Meeting, XP051971145.
European Search Report dated Jul. 31, 2024, issued in European Application No. 22781652.7.

* cited by examiner

METHOD AND APPARATUS FOR TRANSMITTING AND RECEIVING UPLINK DATA AND CONTROL INFORMATION

CROSS-REFERENCE TO RELATED APPLICATION(S)

This application is based on and claims priority under 35 U.S.C. § 119(a) of a Chinese patent application number 202110359918.5, filed on Apr. 2, 2021, in the Chinese Intellectual Property Office, and of a Chinese patent application number 202210273251.1, filed on Mar. 18, 2022, in the Chinese Intellectual Property Office, the disclosure of each of which is incorporated by reference herein in its entirety.

BACKGROUND

1. Field

The disclosure relates to the field of mobile communication technology. More particularly, the disclosure relates to a method and apparatus for transmitting and receiving uplink data and control information.

2. Description of Related Art $5^{th}$ generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement $6^{th}$ generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for transmitting and receiving uplink data and control information.

Additional aspects will be set forth in part in the description which follows and, in part, will be apparent from the description, or may be learned by practice of the presented embodiments.

In accordance with an aspect of the disclosure, a method performed by a second transceiving node in a wireless communication system is provided. The method includes receiving a first data and/or a first control signaling from a first transceiving node, and transmitting, by the second transceiving node, a second data and/or a second control signaling to the first transceiving node in a time unit based on the first data and/or the first control signaling.

In an embodiment, wherein the first data includes physical downlink shared channel (PDSCH) of a first service, the second control signaling includes Hybrid Automatic Repeat request-Acknowledgement (HARQ-ACK), the HARQ-ACK is HARQ-ACK of the first service PDSCH, and the mode of HARQ-ACK feedback of the first service PDSCH is at least one of transmitting an acknowledgement ACK or a negative acknowledgement NACK, transmitting a NACK-only, and not transmitting HARQ-ACK.

In an embodiment, the mode of HARQ-ACK feedback is configured uniformly for all the first service PDSCHs, the mode of HARQ-ACK feedback is configured separately for each first service PDSCH, or the mode of HARQ-ACK feedback is configured separately for available HARQ processes or HARQ process groups of each first service PDSCH.

In an embodiment, further comprising, in a case where a first service PDSCH is a first service semi-persistent scheduling SPS PDSCH, for each first service SPS PDSCH, the mode of HARQ-ACK feedback and/or physical uplink control channel (PUCCH) resources or PUCCH resource sets for HARQ-ACK is configured respectively, and the HARQ-ACK of the SPS PDSCH(s) is determined according to at least one of set/configuration 1: configurations of all multicast/broadcast SPS PDSCH configuration(s), set/configuration 2: configuration of multicast/broadcast SPS PDSCH(s) configured with transmitting HARQ-ACK, set/configuration 3: configuration of multicast/broadcast SPS PDSCH(s) configured with transmitting ACK/NACK, and set/configuration 4: configuration of multicast/broadcast SPS PDSCH(s) configured with transmitting ACK/NACK and/or transmit NACK-only.

In an embodiment, further comprising, the mode of HARQ-ACK feedback of associated PDSCH is configured for each multicast/broadcast control resource set CORESET and/or search space and/or antenna port and/or transmit-receive point TRP respectively, the mode of HARQ-ACK feedback is configured for initial transmission and retransmission of the first service PDSCH respectively, and the mode of HARQ-ACK feedback of the first service PDSCH is dynamically indicated by a DCI.

In an embodiment, further comprising, if the mode of HARQ-ACK feedback of the first service PDSCH is to transmit NACK-only, PUCCH resources are configured for HARQ-ACK of each first service PDSCH or PUCCH resource sets are configured for HARQ-ACK of all PDSCHs of the first service.

In an embodiment, the time unit is a PUCCH time unit, and more than one PUCCH with HARQ-ACK is fed back in one PUCCH time unit, wherein each of the more than one PUCCH is determined from the PUCCH resource sets based on PRI indication and/or a number of the HARQ-ACK bits.

In an embodiment, the time unit is a PUCCH time unit, and the method further comprising configuring the PUCCH time unit for the first service PDSCH, and determining the time unit where the PUCCH used for the HARQ-ACK of the first service PDSCH is located according to the configured PUCCH time unit and predefined parameters.

In an embodiment, the first data further includes a second service PDSCH, and the second control signaling further includes one or more of channel status information (CSI) and scheduling request (SR), and if a PUCCH with HARQ-ACK of the first service PDSCH overlaps with a PUCCH with HARQ-ACK of the second service PDSCH and/or PUCCH with an SR and/or a PUCCH with CSI in time domain, it is specified in a standard and/or configured via higher layer signaling that the PUCCH with HARQ-ACK of the first service PDSCH and the PUCCH with HARQ-ACK of the second service PDSCH and/or the PUCCH with an SR and/or the PUCCH with CSI are transmitted simultaneously.

In an embodiment, the first data further includes a second service PDSCH, and if a PUCCH with NACK-only of the second service PDSCH overlaps with a PUCCH with ACK/NACK of the second service PDSCH or the first service PDSCH in time domain, it is specified in a standard and/or configured via higher layer signaling to only transmit the PUCCH with ACK/NACK, or a PUCCH with NACK-only, or to multiplex the PUCCH with NACK-only and the PUCCH with ACK/NACK in a PUCCH.

In an embodiment, if more than two second data and/or the second control signaling overlap in time domain, it is specified in a standard and/or configured via higher layer signaling an order of multiplexing or prioritizing the more than two second data and/or the second control signaling.

In accordance with another aspect of the disclosure, a second transceiving node in a wireless communication system is provided. The second transceiving node includes a transceiver, configured to receive a first data and/or a first control signaling from a first transceiving node, and transmit a second data and/or a second control signaling to the first transceiving node in a time unit, and a controller, configured to control overall operation of the second transceiving node, including controlling the transceiver to transmit the second data and/or the second control signaling to the first transceiving node during the time unit based on the first data and/or the first control signaling.

In accordance with another aspect of the disclosure, a method performed by a first transceiving node in a wireless communication system is provided. The method includes transmitting a first data and/or a first control signaling to a second transceiving node, and receiving a second data and/or a second control signaling from the second transceiving node in a time unit, wherein the second data and/or the second control signaling is determined by the second transceiving node based on the first data and/or the first control signaling.

In accordance with another aspect of the disclosure, a first transceiving node in a wireless communication system is provided. The first transceiving node includes a transceiver, configured to transmit a first data and/or a first control signaling to a second transceiving node, and receive a second data and/or a second control signaling from the second transceiving node in a time unit, and a controller, configured to control overall operation of the first transceiving node, including controlling the transceiver to transmit the first data and/or the first control signaling to the second transceiving node, and receive the second data and/or the second control signaling from the second transceiving node during the time unit, wherein the second data and/or the second control signaling is determined by the second transceiving node based on the first data and/or the first control signaling.

In accordance with another aspect of the disclosure, a method performed by a terminal is provided. The method includes receiving, from a base station, a radio resource control (RRC) message including first configuration information for a hybrid automatic repeat request (HARQ)-acknowledgement (ACK) feedback mode related to a multicast physical downlink shared channel (PDSCH) and second configuration information for a physical uplink control channel (PUCCH) resource set related to the HARQ-ACK feedback mode, receiving, from the base station, the multicast PDSCH, and transmitting, to the base station, HARQ-ACK information for the multicast PDSCH based on the first configuration information and the second configuration information.

In accordance with another aspect of the disclosure, a method performed by a base station is provided. The method includes transmitting, to a base terminal, a RRC message including first configuration information for a HARQ-ACK feedback mode related to a multicast PDSCH and second configuration information for a PUCCH resource set related to the HARQ-ACK feedback mode, transmitting, to the terminal, the multicast PDSCH, and receiving, from the base station, HARQ-ACK information for the multicast PDSCH based on the first configuration information and the second configuration information.

In accordance with another aspect of the disclosure, a terminal is provided. The terminal includes a transceiver, and a controller coupled with the transceiver and configured to receive, from a base station, a RRC message including first configuration information for a HARQ-ACK feedback mode related to a multicast PDSCH and second configuration information for a PUCCH resource set related to the HARQ-ACK feedback mode, receive, from the base station, the multicast PDSCH, and transmit, to the base station, HARQ-ACK information for the multicast PDSCH based on the first configuration information and the second configuration information.

In accordance with another aspect of the disclosure, a base station is provided. The base station includes a transceiver, and a controller configured to transmit, to a terminal, a RRC message including first configuration information for a HARQ-ACK feedback mode related to a multicast PDSCH and second configuration information for a PUCCH resource set related to the HARQ-ACK feedback mode, transmit, to the terminal, the multicast PDSCH, and receive, from the base station, HARQ-ACK information for the multicast PDSCH based on the first configuration information and the second configuration information.

Another aspect of the disclosure is to provide an electronic device including a memory configured to store a computer program, and a processor configured to run the computer program to implement the method described in any one of the above aspects.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
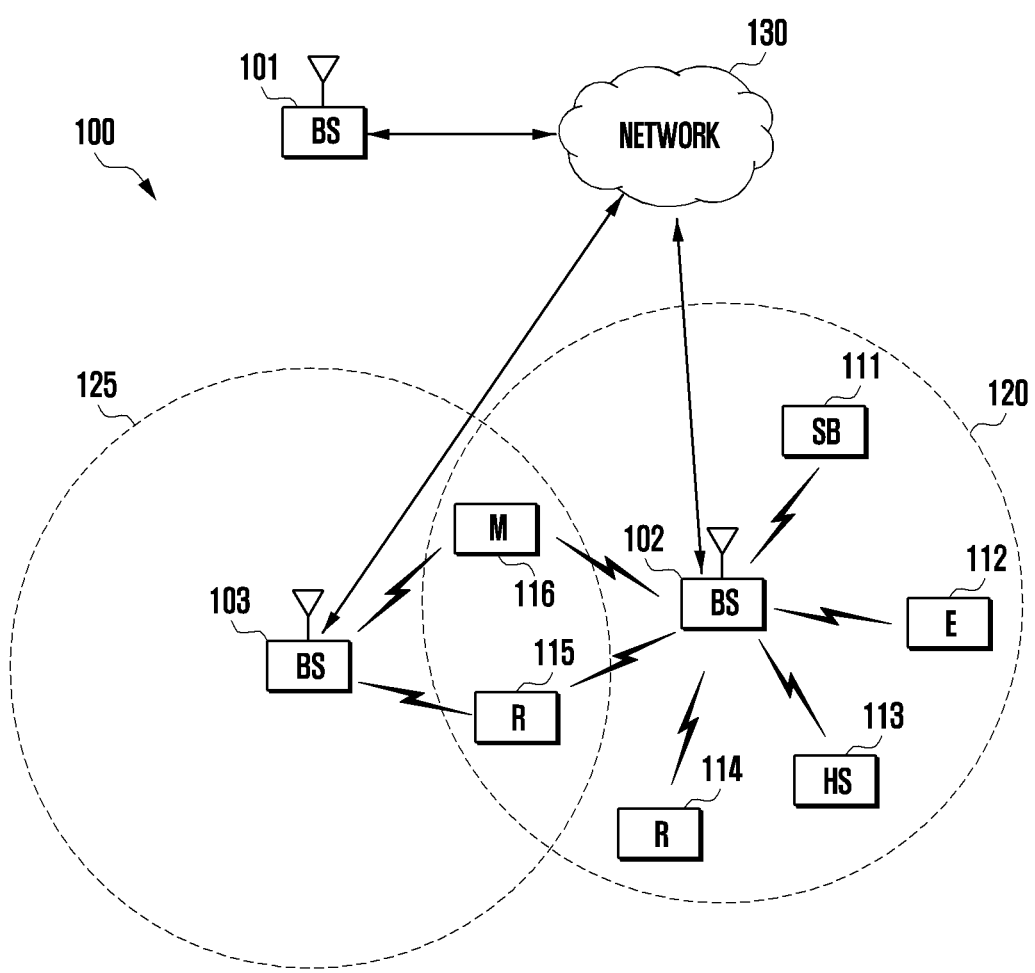
FIG. 1 illustrates a schematic diagram of an example wireless network according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive,"

and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, connect to, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C. For example, "at least one of: A, B, or C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as Read-Only Memory (ROM), Random Access Memory (RAM), a hard disk drive, a Compact Disc (CD), a Digital Video Disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Terms used herein to describe the embodiments of the disclosure are not intended to limit and/or define the scope of the present disclosure. For example, unless otherwise defined, the technical terms or scientific terms used in the disclosure shall have the ordinary meaning understood by those with ordinary skills in the art to which the disclosure belongs.

It should be understood that "first", "second" and similar words used in the disclosure do not express any order, quantity or importance, but are only used to distinguish different components. Unless otherwise indicated by the context clearly, similar words such as "a", "an" or "the" in a singular form do not express a limitation of quantity, but express an existence of at least one.

As used herein, any reference to "one example" or "example", "one embodiment" or "embodiment" means that particular elements, features, structures or characteristics described in connection with the embodiment are included in at least one embodiment. The phrases "in one embodiment" or "in one example" appearing in different places in the specification do not necessarily refer to the same embodiment.

It will be further understood that similar words such as the term "include" or "comprise" mean that elements or objects appearing before the word encompass the listed elements or objects appearing after the word and their equivalents, but other elements or objects are not excluded. Similar words such as "connect" or "connected" are not limited to physical or mechanical connection, but can include electrical connection, whether direct or indirect. "Upper", "lower", "left" and "right" are only used to express a relative positional relationship, and when an absolute position of the described object changes, the relative positional relationship may change accordingly.

The various embodiments discussed below for describing the principles of the disclosure in the patent document are for illustration only and should not be interpreted as limiting the scope of the disclosure in any way. Those skilled in the art will understand that the principles of the disclosure can be implemented in any suitably arranged wireless communication system. For example, although the following detailed description of the embodiments of the disclosure will be directed to long term evolution (LTE) and 5G communication system, those skilled in the art can understand that the main points of the disclosure can also be applied to other communication systems with similar technical backgrounds and channel formats with slight modifications without departing from the scope of the disclosure. The technical solutions of the embodiments of the application can be applied to various communication systems, for example, the communication systems may include a global system for mobile communications (GSM) system, code division multiple access (CDMA) system, wideband code division multiple access (WCDMA) system, general packet radio service (GPRS), long term evolution (LTE) system, LTE frequency division duplex (FDD) system, LTE time division duplex (TDD), universal mobile telecommunications system (UMTS), worldwide interoperability for microwave access (WiMAX) communication system, 5th generation (5G) system or new radio (NR), etc. In addition, the technical schemes of the embodiments of the application can be applied to future-oriented communication technologies.

Hereinafter, the embodiments of the disclosure will be described in detail with reference to the accompanying drawings. It should be noted that the same reference numerals in different drawings will be used to refer to the same elements already described.

FIG. 1 illustrates an example wireless network 100 according to an embodiment of the disclosure.

Referring to FIG. 1, the embodiment of the wireless network 100 is for illustration only. Other embodiments of the wireless network 100 can be used without departing from the scope of the disclosure.

The wireless network 100 includes a gNodeB (gNB) 101, a gNB 102, and a gNB 103. The gNB 101 communicates with the gNB 102 and the gNB 103. The gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

The gNB 102 provides wireless broadband access to the network 130 for a first plurality of User Equipments (UEs) within a coverage area 120 of the gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. The gNB 103 provides wireless broadband access to network 130 for a second plurality of UEs within a coverage area 125 of the gNB 103. The second plurality of UEs include a UE 115 and a UE 116. In some embodiments, one or more of gNBs 101-103 can communicate with each other and with UEs 111-116 using 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, the gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
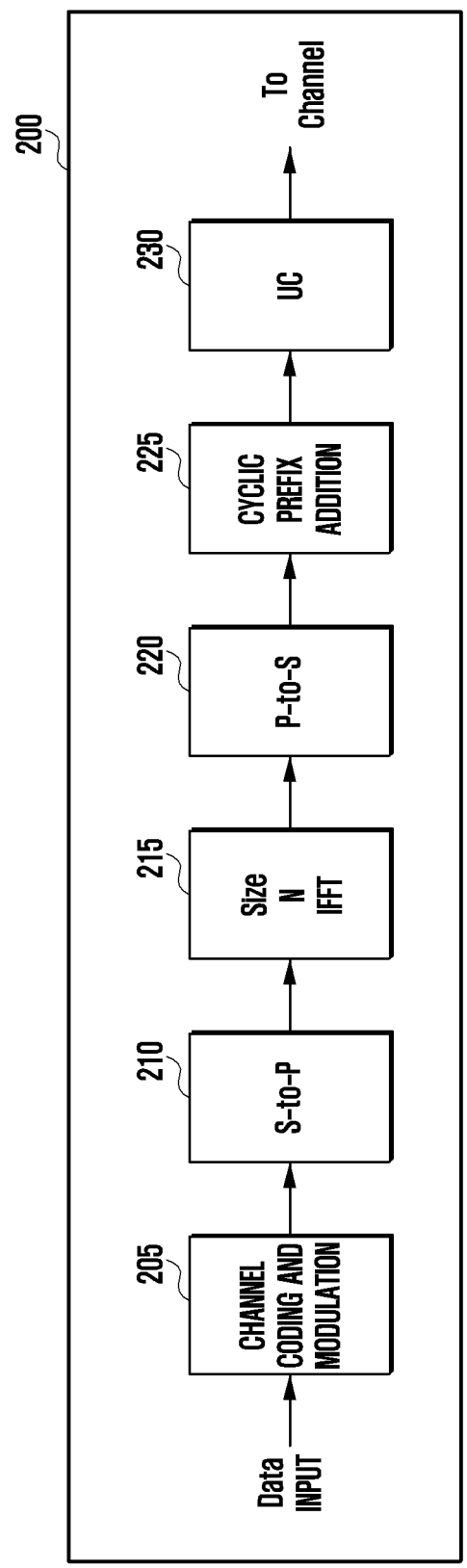
FIG. 2A illustrates an example wireless transmission path according to an embodiment of the disclosure.
Figure 2B:
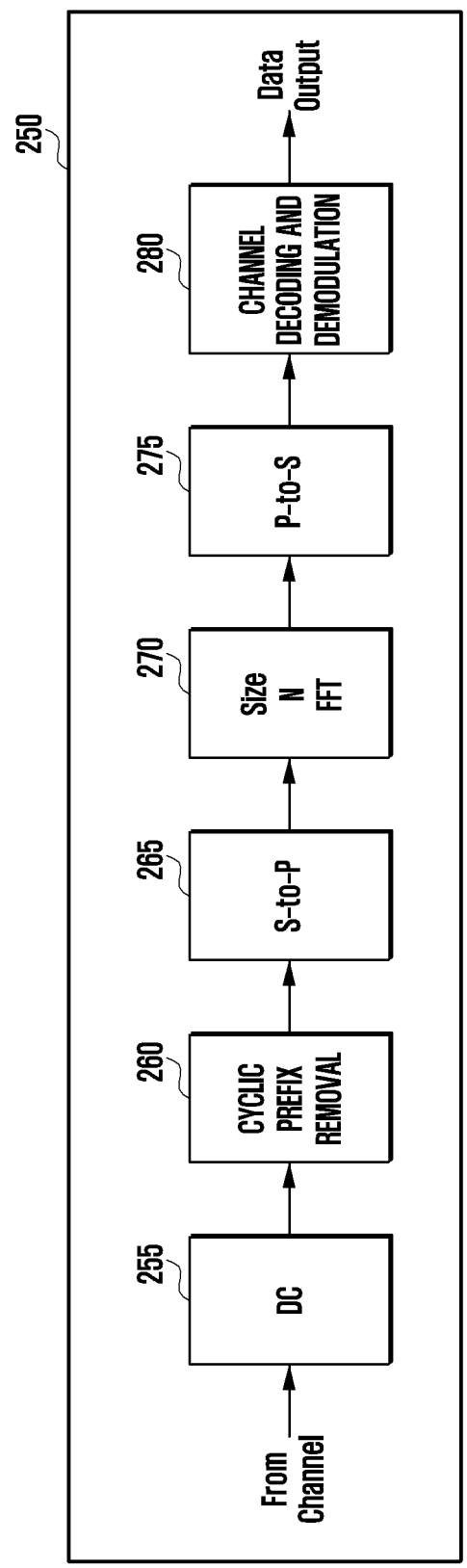
FIG. 2B illustrates an example wireless reception path according to an embodiment of the disclosure.

FIGS. 2A and 2B illustrate example wireless transmission and reception paths according to various embodiments of the disclosure. In the following description, the transmission path 200 can be described as being implemented in a gNB, such as the gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in the gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from the gNB 102 arrives at UE 116 after passing through the wireless channel, and operations in reverse to those at the gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B.

Referring to FIGS. 2A and 2B, various components can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
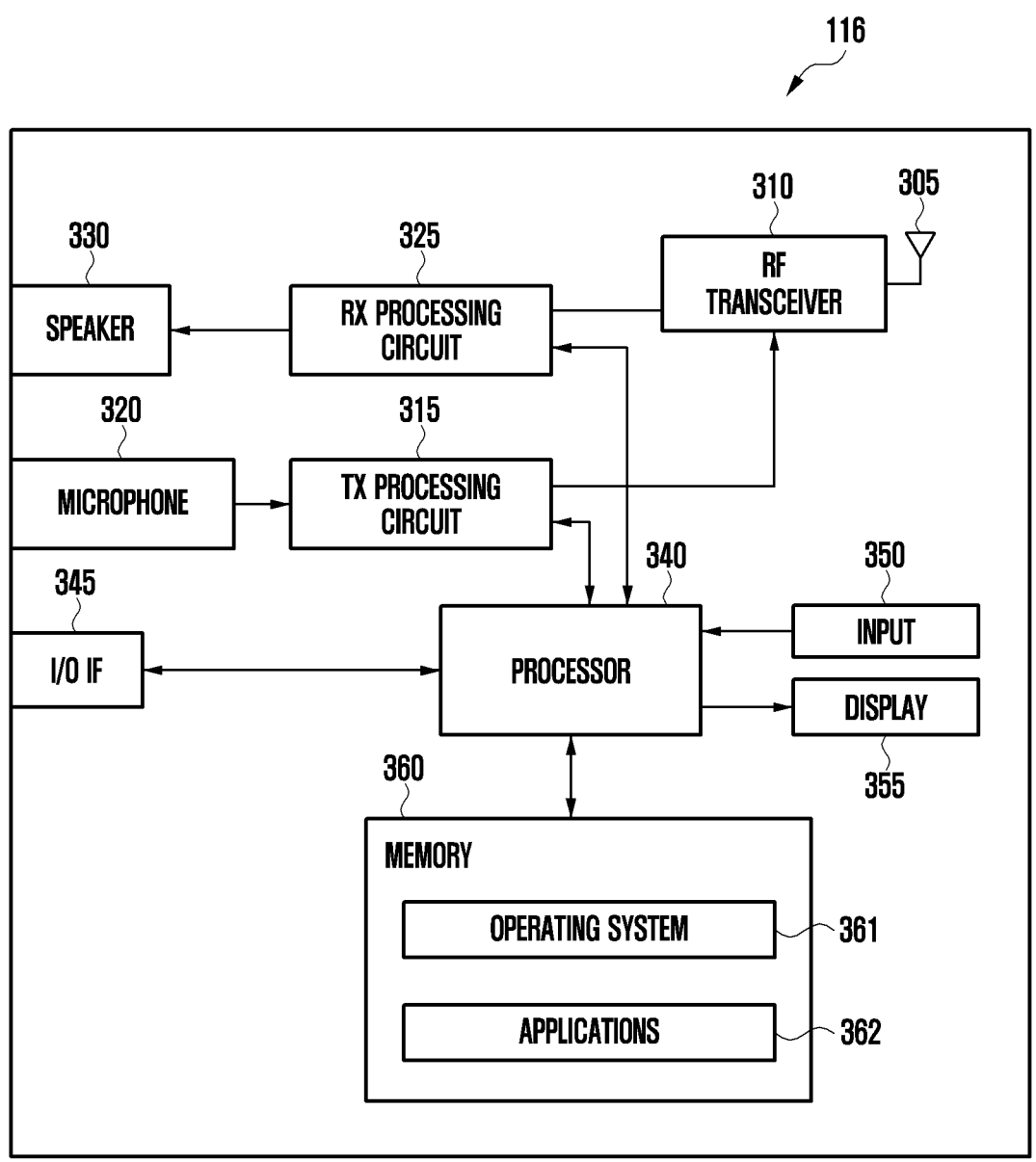
FIG. 3A illustrates an example user equipment (UE) according to an embodiment of the disclosure.

FIG. 3A illustrates an example UE 116 according to an embodiment of the disclosure.

Referring to FIG. 3A, the embodiment of UE 116 is for illustration only, and UEs 111-115 of FIG. 1 can have the same or similar configuration. However, a UE has various configurations, and FIG. 3A does not limit the scope of the disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
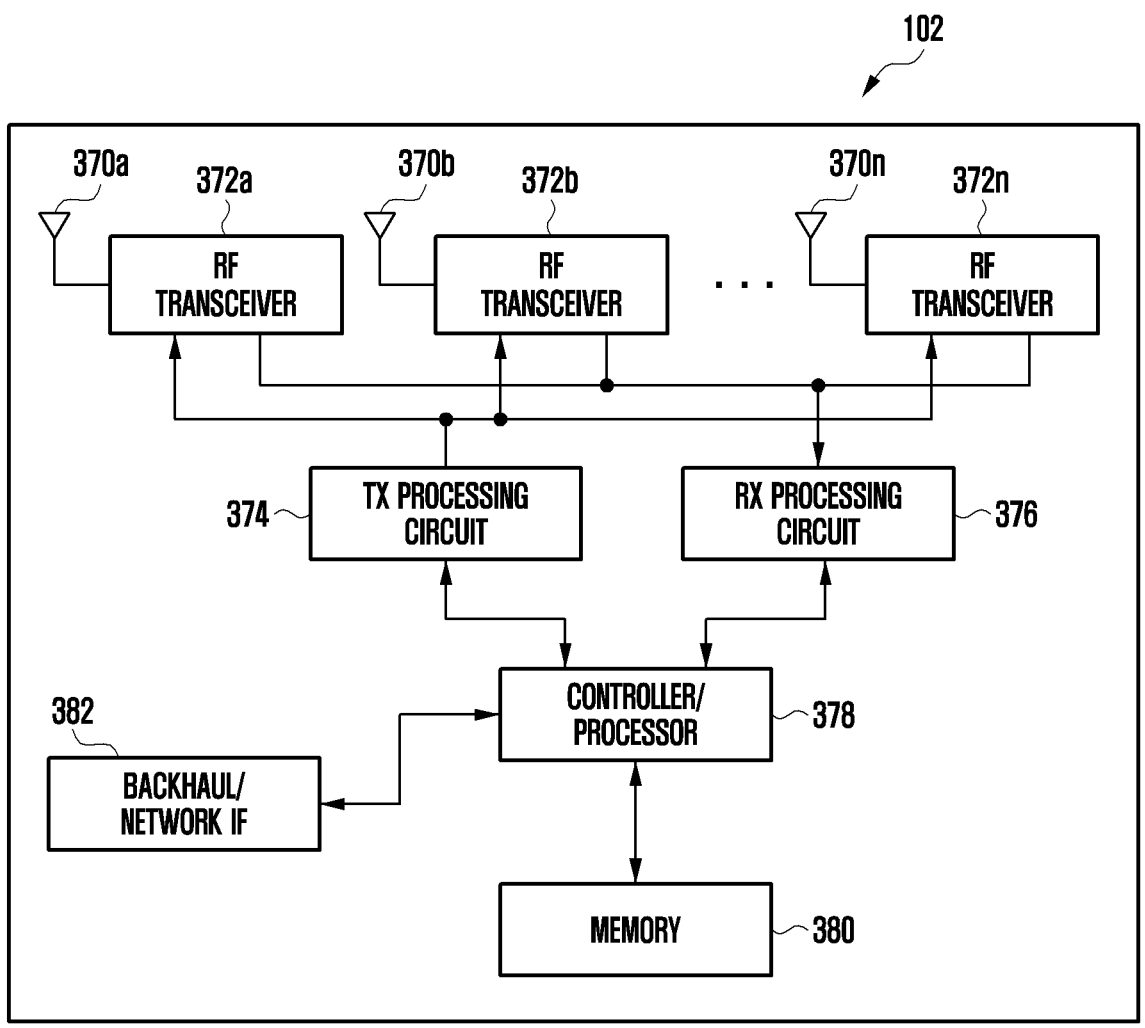
FIG. 3B illustrates an example gNB according to an embodiment of the disclosure.

FIG. 3B illustrates an example gNB 102 according to the disclosure. The embodiment of the gNB 102 shown in FIG. 3B is for illustration only, and other gNBs of FIG. 1 can have the same or similar configuration. However, a gNB has various configurations, and FIG. 3B does not limit the scope of the disclosure to any specific implementation of a gNB. It should be noted that the gNB 101 and the gNB 103 can include the same or similar structures as the gNB 102.

Referring to FIG. 3B, the gNB 102 includes a plurality of antennas 370a, 370b, . . . , 370n, a plurality of RF transceivers 372a, 372b, . . . , 372n, a transmission (TX) processing circuit 374, and a reception (RX) processing circuit 376. In certain embodiments, one or more of the plurality of antennas 370a, 370b, . . . , 370n include a 2D antenna array. The gNB 102 also includes a controller/processor 378, a memory 380, and a backhaul or network interface 382.

RF transceivers 372a, 372b, . . . , 372n receive an incoming RF signal from antennas 370a, 370b, . . . , 370n, such as a signal transmitted by UEs or other gNBs. RF transceivers 372a, 372b, . . . , 372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a, 372b, . . . , 372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of the gNB 102. For example, the controller/processor 378 can control the reception of forward channel signals and the transmission of backward channel signals through the RF transceivers 372a, 372b, . . . , 372n, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in the gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows the gNB 102 to communicate with other devices or systems through a backhaul connection or through a network. The backhaul or network interface 382 can support communication over any suitable wired or wireless connection(s). For example, when the gNB 102 is implemented as a part of a cellular communication system, such as a cellular communication system supporting 5G or new radio access technology or NR, LTE or LTE-A, the backhaul or network interface 382 can allow the gNB 102 to communicate with other gNBs through wired or wireless backhaul connections. When the gNB 102 is implemented as an access point, the backhaul or network interface 382 can allow the gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include a RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of the gNB 102 (implemented using RF transceivers 372a, 372b, . . . , 372n, TX processing circuit 374 and/or RX processing circuit 376) support aggregated communication with FDD cells and TDD cells.

Although FIG. 3B illustrates an example of a gNB 102, various changes may be made to FIG. 3B. For example, the gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, the gNB 102 can include multiple instances of each (such as one for each RF transceiver).

Those skilled in the art can understood that, "terminal" and "terminal device" as used herein include not only devices with wireless signal receiver which have no transmitting capability, but also devices with receiving and transmitting hardware which can carry out bidirectional communication on a bidirectional communication link. Such devices may include cellular or other communication devices with single-line displays or multi-line displays or cellular or other communication devices without multi-line displays; a PCS (personal communications service), which may combine voice, data processing, fax and/or data communication capabilities; a PDA (Personal Digital Assistant), which may include a radio frequency receiver, a pager, an internet/intranet access, a web browser, a notepad, a calendar and/or a GPS (Global Positioning System) receiver; a conventional laptop and/or palmtop computer or other devices having and/or including a radio frequency receiver. "Terminal" and "terminal device" as used herein may be portable, transportable, installed in vehicles (aviation, sea transportation and/or land), or suitable and/or configured to operate locally, and/or in distributed form, operate on the earth and/or any other position in space. "Terminal" and "terminal device" as used herein may also be a communication terminal, an internet terminal, a music/video playing terminal, such as a PDA, a MID (Mobile Internet Device) and/or a mobile phone with music/video playing functions, a smart TV, a set-top box and other devices.

With the rapid development of information industry, especially the increasing demand from mobile Internet and internet of things (IoT), it brings unprecedented challenges to the future mobile communication technology. According to the report of International Telecommunication Union (ITU) ITU-R M. [IMT.BEYOND 2020.TRAFFIC], it can be predicted that by 2020, compared with 2010 (4G era), the growth of mobile traffic will be nearly 1000 times, and the number of UE connections will also exceed 17 billion, and the number of connected devices will be even more alarming, with the massive IoT devices gradually infiltrating in the mobile communication network. In order to meet the unprecedented challenges, the communication industry and academia have carried out extensive research on the fifth generation (5G) mobile communication technology to face the 2020s. At present in ITU report ITU-R M. [IMT.VISION], the framework and overall goals of the future 5G has been discussed, in which the demand outlook, application scenarios and important performance indicators of 5G are described in detail. With respect to new requirements in 5G, ITU report ITU-R M.[IMT.FUTURE TECHNOLOGY TRENDS] provides information related to the technology trends of 5G, aiming at solving significant problems such as significantly improved system throughput, consistent user experience, scalability to support IoT, delay, energy efficiency, cost, network flexibility, support of emerging services and flexible spectrum utilization. In 3GPP (3rd Generation Partnership Project), the first stage of 5G is already in progress. To support more flexible scheduling, the 3GPP decides to support variable Hybrid Automatic Repeat Request-Acknowledgement (HARQ-ACK) feedback delay in 5G. In existing Long Term Evolution (LTE) systems, a time from reception of downlink data to uplink transmission of HARQ-ACK is fixed. For example, in Frequency Division Duplex (FDD) systems, the delay is 4 subframes. In Time Division Duplex (TDD) systems, a HARQ-ACK feedback delay is determined for a corresponding downlink subframe according to an uplink and downlink configuration. In 5G systems, whether FDD or TDD systems, for a determined downlink time unit (for example, a downlink slot or a downlink mini slot), the uplink time unit that can feedback HARQ-ACK is variable. For example, the delay of HARQ-ACK feedback can be dynamically indicated by physical layer signaling, or different HARQ-ACK delays can be determined according to factors such as different services or user capabilities.

The 3GPP has defined three directions of 5G application scenarios-eMBB (enhanced mobile broadband), mMTC (massive machine-type communication) and URLLC (ultra-reliable and low-latency communication). The eMBB scenario aims to further improve data transmission rate on the basis of the existing mobile broadband service scenario, so as to enhance user experience and pursue ultimate communication experience between people. mMTC and URLLC are the application scenarios of the Internet of Things, but their respective emphases are different: mMTC being mainly information interaction between people and things, while URLLC mainly reflecting communication requirements between things.

In 5G, eMBB and URLLC will adopt a way of joint networking, that is, both URLLC services and eMBB services are supported in the same cell. Since URLLC services may be sparse services, compared with URLLC alone networking, eMBB and URLLC joint networking can improve the spectrum efficiency of the system. When there are URLLC services in the system, it is preferred to schedule URLLC services, and when there are no URLLC services in the system or the resources occupied by URLLC services are less, eMBB services can be scheduled. At present, when there is a conflict between URLLC services and eMBB services, data and/or control information of URLLC services will be preferentially transmitted, thus losing performance of eMBB services. Therefore, how to optimize the transmission of data and control information of services (e.g., eMBB services) is a problem to be solved urgently.

To at least solve the above problems, the embodiments of the disclosure provide a method and apparatus for transmitting and receiving uplink data and control information in a wireless communication system. Hereinafter, various embodiments of the disclosure will be described in detail with reference to the accompanying drawings.

In the embodiments of the disclosure, a first transceiving node may be a base station, and a second transceiving node may be a UE. In the following examples, the base station is taken as an example (but not limited thereto) to illustrate the first transceiving node, and the UE is taken as an example (but not limited thereto) to illustrate the second transceiving node.

The various embodiments of the disclosure are further described below in conjunction with the accompanying drawings.

The text and drawings are provided as examples only to help readers understand the disclosure. They are not intended and should not be construed as limiting the scope of the disclosure in any way. Although certain embodiments and examples have been provided, based on the content disclosed herein, it is obvious to those skilled in the art that the embodiments and examples shown can be modified without departing from the scope of the disclosure.

Figure 4:
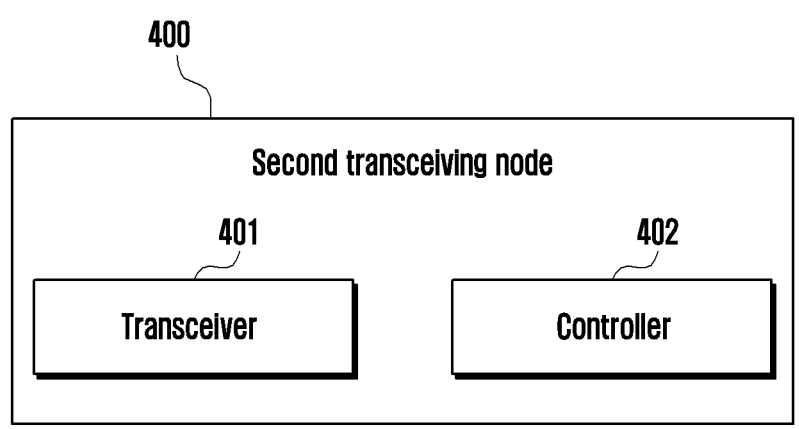
FIG. 4 illustrates a block diagram of a second transceiving node according to an embodiment of the disclosure.

FIG. 4 illustrates a block diagram of a second transceiving node according to an embodiment of the disclosure.

Referring to FIG. 4, the second transceiving node 400 may include a transceiver 401 and a controller 402.

The transceiver 401 may be configured to receive a first data and/or a first control signaling from a first transceiving node, and transmit a second data and/or a second control signaling to the first transceiving node during the time unit.

The controller 402 may be an Application Specific Integrated Circuit or at least one processor. The controller 402 may be configured to control the overall operation of the second transceiving node and control the second transceiving node to implement the methods proposed in the embodiments of the disclosure. For example, the controller 402 may be configured to, determine the second data and/or the second control signaling based on the first data and/or the first control signaling, and control the transceiver 401 to transmit the second data and/or the second control signaling to the first transceiving node during the time unit.

In some implementations, the controller 402 may be configured to perform one or more of the methods of the various embodiments described below. For example, the controller 402 may be configured to execute one or more operations of the method 500 described in conjunction with FIG. 5.

In some implementations, the first data may be data transmitted by the first transceiving node to the second transceiving node. In the following examples, downlink data in a Physical Downlink Shared Channel (PDSCH) is taken as an example (but not limited thereto) to illustrate the first data.

In some implementations, the second data may be data transmitted by the second transceiving node to the first transceiving node. In the following examples, uplink data in a Physical Uplink Shared Channel (PUSCH) is taken as an example (but not limited thereto) to illustrate the second data.

In some implementations, the first control signaling may be control signaling transmitted by the first transceiving node to the second transceiving node. In the following examples, downlink control signaling is taken as an example (but not limited thereto) to illustrate the first control signaling. The downlink control signaling may be DCI (Downlink control information) in a Physical Downlink Control Channel (PDCCH) and/or control signaling in a PDSCH. For example, the DCI may be a UE Specific DCI; the DCI may also be a common DCI; the common DCI may be a common DCI of some UEs, for example, a group common DCI; the common DCI may also be a common DCI of all UEs. The DCI may be an uplink DCI (e.g., a DCI for scheduling a PUSCH) and/or a downlink DCI (e.g., a DCI for scheduling a PDSCH).

In some implementations, the second control signaling may be control signaling transmitted by the second transceiving node to the first transceiving node. In the following examples, uplink control signaling is taken as an example (but not limited thereto) to illustrate the second control signaling. The uplink control signaling may be Uplink Control Information (UCI) in a Physical Uplink Control Channel (PUCCH) and/or control signaling in a Physical Uplink Shared Channel (PUSCH). The types of UCI may contain one or more of: HARQ-ACK information, a Scheduling Request (SR), a Link Recovery Request (LRR), Chanel State Information (CSI), or Configured grant (CG) UCI. In the embodiment of the disclosure, when the UCI is carried in PUCCH, the UCI may be used interchangeably with the PUCCH.

In some implementations, the PUCCH with SR may be a PUCCH with a positive SR. The PUCCH with SR may be a PUCCH with a negative SR. The PUCCH with SR may be a PUCCH with a positive SR and/or a negative SR.

In some implementations, the PUCCH with SR may be a PUCCH with a positive SR. The PUCCH with SR may be a PUCCH with a negative SR. The PUCCH with SR may be a PUCCH with a positive SR and/or a negative SR.

In some implementations, the CSI may also be Part 1 CSI and/or Part 2 CSI.

In some implementations, the time unit is the time unit in which the first transceiving node transmits the first data and/or the second control signaling. In the following examples, an uplink time unit is taken as an example (but not limited thereto) to illustrate the first time unit.

In some implementations, the time unit is the time unit in which the second transceiving node transmits the second data and/or the second control signaling. In the following examples, an uplink time unit is taken as an example (but not limited thereto) to illustrate the second time unit.

In some implementations, the first time unit and the second time unit may be one or more slots, one or more sub-slots, one or more OFDM (Orthogonal Frequency Division Multiplexing) symbols, or one or more subframes.

Depending on the network type, the term "base station" or "BS" can refer to any component (or collection of components) configured to provide wireless access to a network, such as a transmit point (TP), a transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), Long Term Evolution (LTE), LTE advanced (LTE-A), High Speed Packet Access (HSPA), Wi-Fi 802.11a/b/g/n/ac, etc. For the sake of convenience, the terms "BS" and "gNB" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," "user device," or simply "terminal." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

In describing the wireless communication system and in the disclosure described below, higher layer signaling or higher layer signal is a signal transmission method for transmitting information from a base station to a terminal through a downlink data channel of physical layer or transmitting information from a terminal to a base station through a uplink data channel of physical layer, an example of the signal transmission method may include signal transmission methods for transmitting information through radio resource control (RRC) signaling, packet data convergence protocol (PDCP) signaling, or medium access control (MAC) control element (MAC CE).

Figure 5:
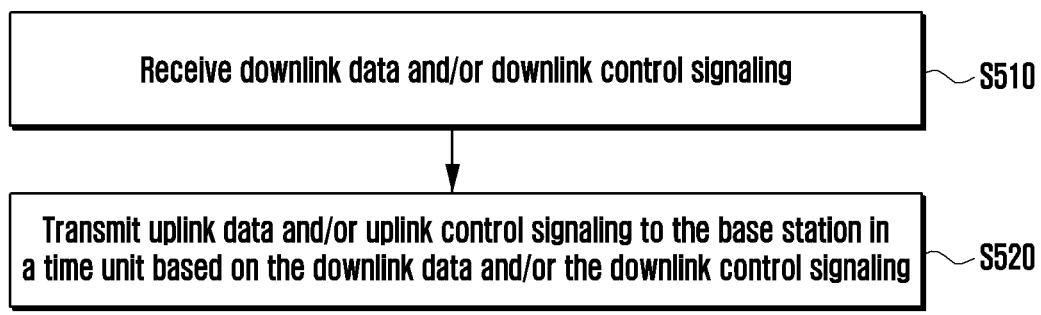
FIG. 5 illustrates a flowchart of a method performed by a UE according to an embodiment of the disclosure.

FIG. 5 illustrates a flowchart of a method performed by a UE according to an embodiment of the disclosure.

Referring to FIG. 5, in operation S510, the UE receives downlink data and/or downlink control signaling from a base station.

In operation S520, the UE transmits uplink data and/or uplink control signaling to the base station during the time unit based on the downlink data and/or the downlink control signaling.

In some implementations, the downlink control signaling may include DCI in the PDCCH and/or control signaling in the PDSCH. For example, the DCI can be used to schedule PUSCH transmission or PDSCH reception. Some examples of uplink transmission timing will be described below with reference to FIGS. 6A to 6C.

In one example, the UE receives the DCI and receives the PDSCH according to time domain resources indicated in the DCI. For example, a parameter K0 may be used to indicate a time interval between the PDSCH scheduled by the DCI and the PDCCH with the DCI, and the unit of K0 may be a slot.

Figure 6A:
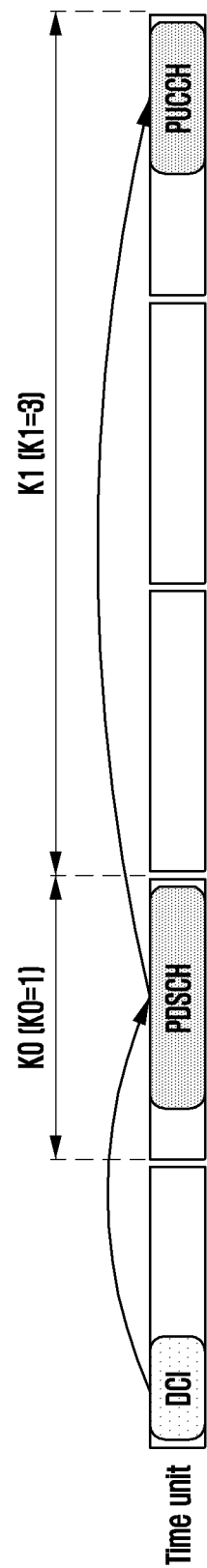
FIG. 6A illustrates an example of uplink transmission timing according to an embodiment of the disclosure.
Figure 6B:
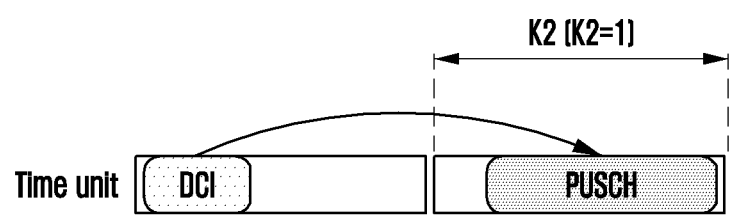
FIG. 6B illustrates an example of uplink transmission timing according to an embodiment of the disclosure.
Figure 6C:
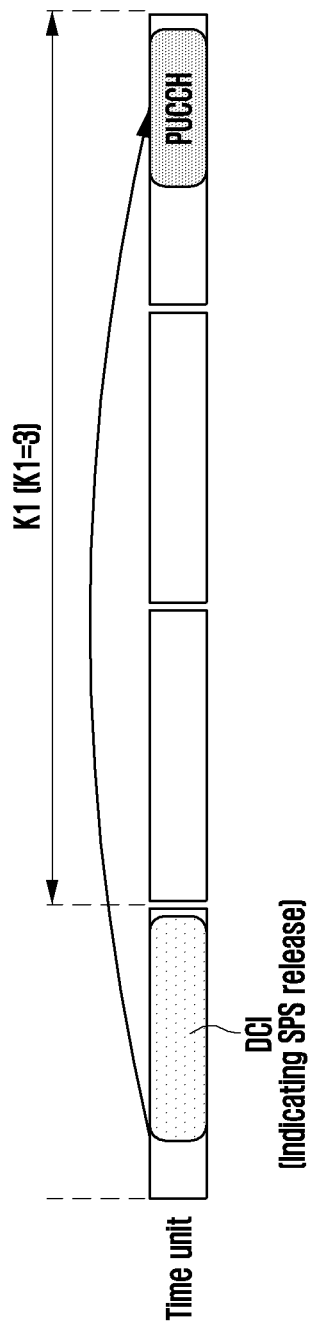
FIG. 6C illustrates an example of uplink transmission timing according to an embodiment of the disclosure.

FIGS. 6A to 6C illustrates examples of uplink transmission timing according to various embodiments of the disclosure.

Referring to FIG. 6A, it shows an example of K0=1. In the example shown in FIG. 6A, the time interval between the PDSCH scheduled by the DCI and the PDCCH with the DCI is 1 slot. In the embodiment of the disclosure, that "the UE receives the DCI" refers to that "the UE detects the DCI".

In another example, the UE receives the DCI and transmits the PUSCH according to the time domain resources indicated in the DCI. For example, a parameter K2 may be used to indicate a time interval between the PUSCH scheduled by the DCI and the PDCCH with the DCI, and the unit of K2 may be a slot.

Referring to FIG. 6B, it shows an example of K2=1. In the example shown in FIG. 6B, the time interval between the PUSCH scheduled by the DCI and the PDCCH with the DCI is 1 slot. K2 may also represent a time interval between a PDCCH activating CG PUSCHs and the first activated CG PUSCH. In examples of the disclosure, unless otherwise specified, the PUSCH may be a PUSCH dynamically scheduled (e.g. by DCI) (e.g., in the embodiment of the disclosure, it may be referred to a DG (dynamic grant) PUSCH) and/or a PUSCH not scheduled by DCI (e.g., CG PUSCH).

In yet another example, the UE receives the PDSCH, and may transmit HARQ-ACK information of the PDSCH on the PUCCH in the uplink time unit. For example, the parameter K1 may be used to indicate the time interval between the PUCCH for transmitting HARQ-ACK information of the PDSCH and the PDSCH, and the unit of K1 may be an uplink time unit, such as a slot or a sub-slot. When the unit of K1 is a time slot, the time interval is a time slot offset value between the PUCCH for feeding back the HARQ-ACK information of the PDSCH and the PDSCH. For example, FIG. 6A shows an example of K1=3. For example, in the example shown in FIG. 6A, the time interval between the PUCCH for transmitting HARQ-ACK information of the PDSCH and the PDSCH is 3 slots. It should be noted that, in the embodiment of the disclosure, the timing parameter K1 may be used interchangeably with a timing parameter $K_1$, the timing parameter K0 may be used interchangeably with a timing parameter $K_0$, and the timing parameter K2 may be used interchangeably with the timing parameter K2.

The PDSCH may be a PDSCH scheduled by DCI and/or a SPS PDSCH. After the SPS PDSCH is activated by a DCI, the UE will periodically receive the SPS PDSCH. In the example of the disclosure, the SPS PDSCH may be equivalent to the PDSCH without scheduling DCI/PDCCH. After the SPS PDSCH is released (deactivated), the UE no longer receives the SPS PDSCH.

The HARQ-ACK according to the embodiment of the disclosure may be HARQ-ACK of a SPS PDSCH reception (e.g., a HARQ-ACK without DCI indication) and/or HARQ-ACK indicated by a DCI format (e.g., HARQ-ACK of a PDSCH scheduled by a DCI format).

In yet another example, the UE receives DCI (for example, a DCI indicating SPS (Semi-Persistent Scheduling) release), and may transmit HARQ-ACK information of the DCI on the PUCCH of the uplink time unit. For example, the parameter K1 may be used to indicate the time interval between the PUCCH for transmitting HARQ-ACK information of the DCI and the DCI, and the unit of K1 may be an uplink time unit, such as a slot or a sub-slot.

Referring to FIG. 6C, it shows an example of K1=3. In the example of FIG. 6C, the time interval between the PUCCH for transmitting HARQ-ACK information of the DCI and the DCI is 3 slots. For example, the parameter K1 may be used to indicate the time interval between SPS PDSCH reception and the PUCCH feeding back its HARQ-ACK, where the K1 is indicated in the DCI for activating the SPS PDSCH. In some implementations, in operation S520, the UE may report (or signal/transmit) UE capability or indicate UE capability to the base station. For example, the UE reports (or signal/transmit) the UE capability to the base station by transmitting the PUSCH. In this case, the PUSCH transmitted by the UE includes UE capability information.

In some implementations, the base station may configure higher layer signaling for the UE according to the UE capability previously received from the UE (for example, in operation S510 in the previous downlink-uplink transmission process). For example, the base station transmits PDSCH to configure higher layer signaling for the UE. In this case, the PDSCH transmitted by the base station contains higher layer signaling for UE configuration. It should be noted that higher layer signaling is signaling of a higher layer compared to physical layer signaling. For example, the higher layer signaling may include RRC signaling and/or MAC CE, for example.

In NR, the bandwidth of the UE may change dynamically. The base station may configure multiple Bandwidth Parts (BWPs) for the UE via higher layer signaling. The base station may activate one of the BWPs. The base station may also instruct to switch from the activated BWP to another BWP via signaling (for example, DCI). When the UE receives the instruction of BWP switching, the activated BWP is deactivated, and the other BWP is activated.

Figure 7:
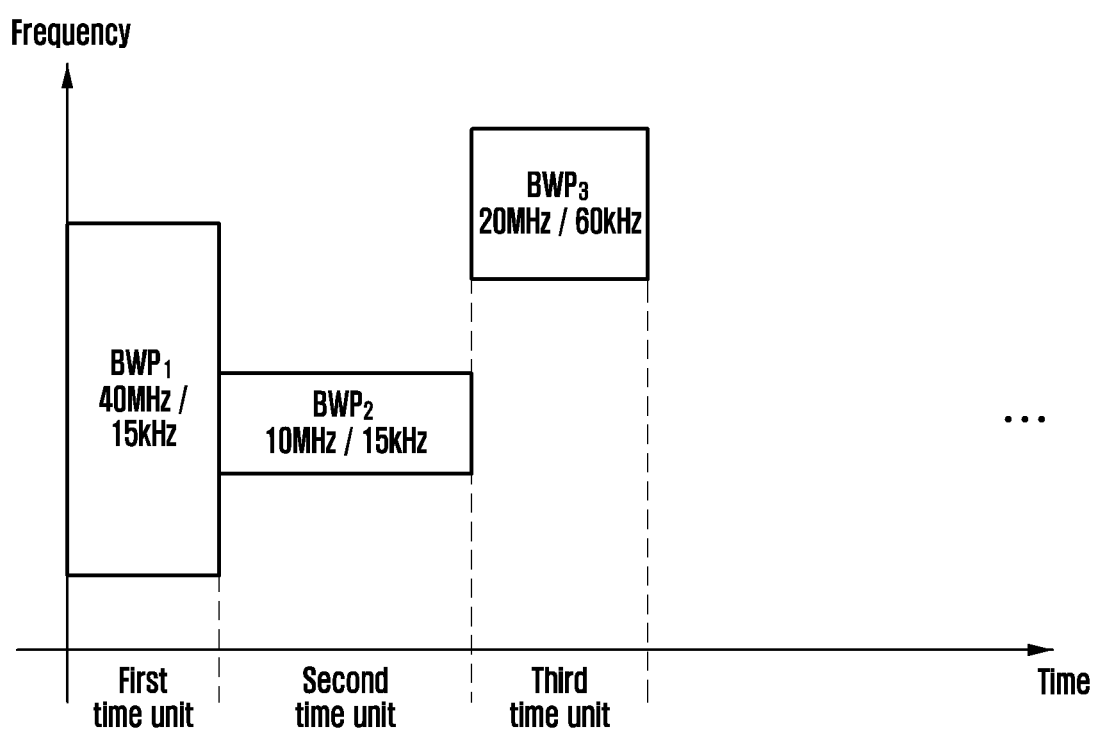
FIG. 7 illustrates an example of bandwidth part (BWP) handover according to an embodiment of the disclosure.

FIG. 7 shows an example of BWP switching according to an embodiment of the disclosure.

Referring to FIG. 7, in a first time unit, the UE has large traffic, and the system configures a large bandwidth (BWP1) of 40 MHz with a subcarrier spacing of 15 KHz for the UE; in a second time unit, the UE has small traffic, and the system configures a small bandwidth (BWP2) of 10 MHz with a subcarrier spacing of 15 KHz for the UE, as long as basic communication requirements are satisfied; and in a third time unit, the system finds that there is a wide range of frequency selective fading in the bandwidth which contains BWP1, or resources in the frequency range which contains BWP1 are relatively scarce, and thus configures a new bandwidth (BWP3) of 20 MHz with a subcarrier spacing of 60 KHz for the UE.

The UE only needs to adopt a center frequency point and a sampling rate of a corresponding BWP within the corresponding BWP. Moreover, each BWP is not only different in frequency point and bandwidth, each BWP may correspond to different configuration. For example, sub-carrier space, CP type, cycle of Synchronization Signal and PBCH block (SSB) of each BWP (including Primary Synchronization Signal (PSS), Secondary Synchronization Signal (SSS) and PBCH) etc. may be configured differently to adapt to different services.

In some implementations, the UE may be configured with two levels of priorities for uplink transmission. For example, the UE may be configured by higher layer signaling (e.g., through a 3GPP parameter UCI-MuxWithDifferentPriority) to multiplex UCIs of different priorities; otherwise (e.g., if the UE is not configured to multiplex the UCIs of different priorities), the UE performs prioritization for PUCCHs and/or PUSCHs of different priorities. For example, the two levels of priorities may include a first priority and a second priority which are different from each other. In one example, the first priority may be higher than the second priority. In another example, the first priority may be lower than the second priority. However, the embodiments of the disclosure are not limited to this, for example, the UE may be configured with more than two levels of priorities. For the sake of convenience, in the embodiments of the disclosure, description will be made considering that the first priority is higher than the second priority. It should be noted that all the embodiments of the disclosure are applicable to scenarios where the first priority may be higher than the second priority; all the embodiments of the disclosure are applicable to scenarios where the first priority may be lower than the second priority; and all embodiments of the disclosure are applicable to scenarios where the first priority may be equal to the second priority.

In one example, the two levels of priorities may be indicated by priority numbers or priority indexes (e.g., priority index 1 and priority index 0). For example, a larger priority index may correspond to the higher priority, that is, a priority corresponding to priority index 1 may be higher than a priority corresponding to priority index 0. In this case, a larger priority index (e.g., priority index 1) may be the higher priority (e.g., the first priority), and a smaller priority index (e.g., priority index 0) may be the lower priority (e.g., the second priority). However, the embodiments of the disclosure are not limited to this, for example, other priority indexes or indicators may be used to indicate the two levels of priorities. For the sake of convenience, in the embodiments of the disclosure, description is made considering that a priority corresponding to a larger priority index (e.g., priority index 1) is higher than a priority corresponding to a smaller priority index (e.g., priority index 0). In addition, in the embodiments of the disclosure, priority index 1 may be used interchangeably with the first priority, a larger priority index or the higher priority, and priority index 0 may be used interchangeably with the second priority, a smaller priority index or the lower priority.

In some implementations, the two levels of priorities configured for the UE may be two physical layer priorities. For example, one of the two levels of priorities (the first priority (e.g., priority index 1) or the second priority (e.g., priority index 0)) may be provided for PUSCH or PUCCH. Specifically, a PUSCH or PUCCH transmission (including a transmission with repetitions if there is a transmission with repetitions) may be of (for example, correspond to) priority index 0 or a larger priority index (e.g., priority index 1).

In some implementations, the first priority or higher priority (e.g., a larger priority index (e.g., priority index 1)) may correspond to a first service (e.g., an URLLC service), and the second priority or lower priority (e.g., a smaller priority index (e.g., priority index 0)) may correspond to a second service (e.g., an eMBB service).

In one example, for a configured grant PUSCH transmission, a UE may determine a priority index according to a priority parameter (for example, the parameter priority in 3GPP) (if configured). For a PUCCH transmission with HARQ-ACK information corresponding to a SPS PDSCH reception or a SPS PDSCH release, a UE may determine the priority index of the PUCCH transmission from a HARQ-ACK codebook priority parameter and/or a HARQ-ACK codebook index parameter (for example, the parameter HARQ-CodebookID in 3GPP) (if configured).

In one example, if no priority is configured or indicated for a certain PUSCH or PUCCH transmission of the UE, the priority index of the PUSCH or PUCCH transmission may be 0.

In one example, if the UE monitors a PDCCH to detect DCI format 0_1 and DCI format 1_1 or to detect DCI format 0_2 and DCI format 1_2 in an active DL BWP, the priority index may be provided by a priority indicator field. If the UE indicates that it has the capability to monitor the PDCCH in the active DL BWP to detect DCI format 0_1 and DCI format 1_1 and to detect DCI format 0_2 and DCI format 1_2, DCI format 0_1 or DCI format 0_2 may schedule a PUSCH transmission with any priority, and DCI format 1_1 or DCI format 1_2 may schedule a PDSCH reception and trigger a PUCCH transmission with corresponding HARQ-ACK information of any priority.

In an example, the UE may be configured with a PUCCH configuration list parameters (for example, the parameter PUCCH-ConfigurationList in 3GPP), which may contain two PUCCH configuration parameters (for example, the parameter PUCCH-Config in 3GPP), including a first PUCCH configuration parameter and a second PUCCH configuration parameter. For example, the first PUCCH configuration parameter may correspond to the second priority (e.g., a smaller priority index (e.g., priority index 0)), that is, the priority of the first PUCCH configuration parameter may be the second priority (e.g., a smaller priority index (e.g., priority index 0)). Also, the second PUCCH configuration parameter may correspond to the first priority (e.g., a larger priority index (e.g., priority index 1)), and the priority of the second PUCCH configuration parameter may be the first priority (e.g., a larger priority index (e.g., priority index 1)).

For example, a sub-slot length parameter (for example, the parameter subslotLengthForPUCCH in 3GPP) of each PUCCH configuration parameter of the first PUCCH configuration parameter and the second PUCCH configuration parameter may be 7 OFDM symbols, or 6 OFDM symbols, or 2 OFDM symbols. Sub-slot configuration lengths parameters of different PUCCH configuration parameters may be configured separately. If no sub-slot configuration length parameter is configured in a PUCCH configuration parameter, the scheduling time unit of the PUCCH configuration parameter is one slot by default. If a sub-slot length parameter is configured in a PUCCH configuration parameter, the scheduling time unit of the PUCCH configuration parameter is a configured sub-slot configuration length in OFDM symbols.

In some implementations, the UE may be configured with a PDSCH HARQ-ACK codebook list parameter (for example, the parameter pdsch-HARQ-ACK-CodebookList in 3GPP). For example, the PDSCH HARQ-ACK codebook list parameter may contain two PDSCH HARQ-ACK codebook configurations parameters (for example, the parameter pdsch-HARQ-ACK-Codebook in 3GPP), including a first PDSCH HARQ-ACK codebook configuration parameter and a second PDSCH HARQ-ACK codebook configuration parameter. For example, the first PDSCH HARQ-ACK codebook configuration parameter corresponds to the first HARQ-ACK codebook configuration, the first HARQ-ACK codebook configuration is associated with a PUCCH with a smaller priority index (e.g., priority index 0), and the second PDSCH HARQ-ACK codebook configuration parameter corresponds to the second HARQ-ACK codebook configuration, the second HARQ-ACK codebook is associated with a PUCCH with the larger priority index (e.g., priority index 1). In this case, the priority of the first HARQ-ACK codebook may be the second priority (e.g., a smaller priority index (e.g., priority index 0)), and the priority of the second HARQ-ACK codebook may be the first priority (e.g., the larger priority index (e.g., priority index 1)). The PDSCH HARQ-ACK codebook configuration (for example, the parameter pdsch-HARQ-ACK-Codebook) is used to configure a HARQ-ACK codebook type, for example, the PDSCH HARQ-ACK codebook configuration parameter may be semi-static (e.g., semiStatic); for example, the PDSCH HARQ-ACK codebook configuration parameter may be dynamic; for example, the PDSCH HARQ-ACK codebook configuration parameter may be enhanced dynamic (for example, the parameter pdsch-HARQ-ACK-Codebook-r16 in 3GPP is enhancedDynamic).

When the uplink physical channel of the UE is configured with multiple priorities, how to improve the possibility and reliability of a physical channel transmission of lower priority under the premise of ensuring the delay and reliability of a physical channel transmission of higher priority is a problem needed to be solved. For example, if PUCCHs with UCIs of different priorities overlap in time domain, multiple PUCCHs may be multiplexed in one PUCCH for transmission, or the multiple PUCCHs may be subjected to prioritization. PUCCH prioritization refers to, for example, transmitting a PUCCH of the higher priority and not transmitting a PUCCH of the lower priority; or multiplexing multiple PUCCHs of the higher priority in one PUCCH for transmission and not transmitting one or more PUCCHs of the lower priority. In different scenarios, the UE can adopt different methods.

The method for multiplexing and/or prioritizing the UCIs of different priorities in the embodiments of the disclosure may also be applicable to UCI(s) of unicast PDSCH(s) and/or UCI(s) of groupcast (or multicast)/broadcast PDSCH(s). For example, the UCIs of the first priority and the second priority may both be HARQ-ACK, SR, and CSI of unicast PDSCH(s). For example, the UCIs of the first priority and the second priority may both be HARQ-ACK of multicast/broadcast PDSCH(s). For example, the UCI of the first priority may be HARQ-ACK, SR, CSI of unicast PDSCH(s), and the UCI of the second priority may be HARQ-ACK of multicast/broadcast PDSCH(s).

In the embodiments of the disclosure, unicast may refer to a way in which a network communicates with one UE, and multicast/broadcast may refer to a way in which the network communicates with multiple UEs. For example, a unicast PDSCH may be a PDSCH received by one UE, and the scrambling of the PDSCH may be based on a UE-specific Radio Network Temporary Indicator (RNTI), e.g., C-RNTI. A unicast PDSCH may also be a unicast SPS PDSCH. A groupcast (or multicast)/broadcast PDSCH may be a PDSCH received by more than one UE at the same time, and the scrambling of multicast/broadcast PDSCH(s) may be based on a UE-group-common RNTI. For example, the UE-group-common RNTI for the scrambling of multicast/broadcast PDSCH(s) may include an RNTI for the scrambling of a dynamically scheduled multicast/broadcast transmission (for example, PDSCH) (referred to as a G-RNTI or a first RNTI in the embodiments of the disclosure) or an RNTI for the scrambling of a multicast/broadcast SPS transmission (for example, SPS PDSCH) (referred to as a GS-RNTI or a second RNTI in the embodiments of the disclosure). The GS-RNTI and G-RNTI can be different RNTIs or the same RNTI. UCI of unicast PDSCH may include HARQ-ACK information, SR, or CSI of unicast PDSCH(s). UCI of multicast/broadcast PDSCH may include HARQ-ACK information of multicast/broadcast PDSCH(s). In the embodiments of the disclosure, "multicast/broadcast" may refer to at least one of multicast or broadcast. In addition, it should be noted that although for convenience of description, the embodiments of the disclosure refer to the RNTI for the scrambling of the dynamically scheduled multicast/broadcast transmission (for example, PDSCH) as the G-RNTI or first RNTI, and refer to the RNTI for the scrambling of the multicast/broadcast SPS transmission (for example, SPS PDSCH) as the GS-RNTI or second RNTI, however, such naming for RNTI is only one example, and any suitable way can be used to name each RNTI. For example, the RNTI for the scrambling of the dynamically scheduled multicast/broadcast transmission (for example, PDSCH) is referred to as a second RNTI, and the RNTI for the scrambling of the multicast/broadcast SPS transmission (for example, SPS PDSCH) is referred to as a first RNTI.

In some implementations, the HARQ-ACK codebook may include HARQ-ACK information of one or more PDSCH and/or DCI. If the HARQ-ACK information of one or more PDSCH and/or DCI is transmitted in a same uplink time unit, the UE may generate the HARQ-ACK codebook according to a predefined rule. For example, the UE can generate the HARQ-ACK codebook according to pseudo code specified in a standard. In one example, if the UE receives a DCI format, where the DCI format indicates SPS deactivation, the UE transmits HARQ-ACK information in the DCI format. In another example, if the UE receives a DCI format, where the DCI format indicates that a secondary cell is dormant, the UE transmits HARQ-ACK information in the DCI format. In yet another example, if the UE receives a DCI format, where the DCI format indicates to transmit HARQ-ACK information for all HARQ-ACK processes (for example, one shot HARQ-ACK codebook, for another example, Type-3 HARQ-ACK codebook in 3GPP (e.g., TS38.213)), the UE transmits the HARQ-ACK information of all HARQ-ACK processes. In yet another example, if the UE receives a DCI format, where the DCI format schedules a PDSCH, the UE transmits HARQ-ACK information of the PDSCH. In yet another example, the UE receives an SPS PDSCH, and the UE transmits HARQ-ACK information of the SPS PDSCH. In yet another example, if the UE is configured to receive the SPS PDSCH by higher layer signaling, the UE transmits HARQ-ACK information of the SPS PDSCH. If the UE is configured to receive the SPS PDSCH by higher layer signaling, the SPS PDSCH may be cancelled by other signaling. In yet another example, if at least one uplink symbol (for example, OFDM symbol) in the semi-static frame structure configured by higher layer signaling overlaps with a symbol of the SPS PDSCH, the UE does not receive the SPS PDSCH. In yet another example, if the UE is configured to receive the SPS PDSCH by higher layer signaling according to a predefined rule, the UE transmits HARQ-ACK information of the SPS PDSCH.

In some implementations, if the HARQ-ACK information transmitted in the same uplink time unit does not include any HARQ-ACK information in the DCI format, nor does it include the HARQ-ACK information of a dynamically scheduled PDSCH (for example, a PDSCH scheduled through the DCI format) and/or DCI, or if the HARQ-ACK information transmitted in the same uplink time unit only includes the HARQ-ACK information of one or more SPS PDSCHs, the UE can generate the HARQ-ACK information according to the rules for generating the SPS PDSCH HARQ-ACK codebook.

In some implementations, if the HARQ-ACK information transmitted in the same uplink time unit includes HARQ-ACK information in any DCI format, and/or HARQ-ACK information of a dynamically scheduled PDSCH (for example, a PDSCH scheduled through a DCI format) and/or DCI, the UE can generate HARQ-ACK information according to the rules for generating the HARQ-ACK codebook of the dynamically scheduled PDSCH and/or the DCI. For example, the UE may determine to generate a semi-static HARQ-ACK codebook (for example, Type-1 HARQ-ACK codebook in 3GPP (e.g., TS 38.213)) or a dynamic HARQ-ACK codebook (for example, Type-2 HARQ-ACK codebook in 3GPP (e.g., TS 38.213)) or an enhanced dynamic HARQ-ACK codebook (for example, Type-2 HARQ-ACK codebook based on grouping and HARQ-ACK retransmission in 3GPP (e.g., TS 38.213)) according to the PDSCH HARQ-ACK codebook configuration parameter (for example, the parameter pdsch-HARQ-ACK-Codebook in 3GPP).

In some implementations, the dynamic HARQ-ACK codebook and/or the enhanced dynamic HARQ-ACK codebook may determine the size and sequence of the HARQ-ACK codebook according to an assignment index. For example, the assignment index may be DAI (Downlink Assignment Index). In the following embodiments, the assignment index is DAI as an example. However, the embodiment of the disclosure is not limited to this, and any other suitable assignment index may be adopted.

In some implementations, the DAI field includes at least one of a first DAI and a second DAI.

In some examples, the first DAI may be C-DAI (Counter-DAI). The first DAI may indicate a cumulative count of at least one of the PDSCH scheduled in the current downlink time unit, or the DCI indicating the SPS PDSCH release, or the DCI indicating the secondary cell dormancy. By receiving time including the first DAI and the information of the first DAI, it is possible to determine respective sorting of bits in the HARQ-ACK codebook corresponding to at least one of the PDSCH reception, the DCI indicating the SPS PDSCH release, or the DCI indicating that the secondary cell dormancy. The first DAI may be included in the downlink DCI format.

In some examples, the second DAI may be T-DAI (Total-DAI). The second DAI may indicate a total number of at least one of all PDSCH receptions corresponding to the uplink time unit, the DCI indicating the SPS PDSCH release, or the DCI indicating that the secondary cell dormancy. The second DAI may be included in a downlink DCI format and/or an uplink DCI format. The second DAI included in the uplink DCI format is also called UL DAI.

In the following example, the first DAI is C-DAI and the second DAI is T-DAI as an example (but not limited to this) to describe.

Table 1 and Table 2 show a corresponding relationship between the DAI field and $V_{T-DAI,m}$ or $V_{C-DAI,c,m}$. The number of bits for C-DAI and T-DAI is limited.

For example, in a case where C-DAI or T-DAI is represented by 2 bits, the value of the C-DAI or T-DAI in DCI can be determined by an equation in Table 1. $V_{T-DAI,m}$ is a value of the T-DAI in the DCI received at a PDCCH monitoring occasion m, and $V_{C-DAI,c,m}$ is a value of the C-DAI in the DCI of a serving cell c received at the PDCCH monitoring occasion m. Both $V_{T-DAI,m}$ and $V_{C-DAI,c,m}$ are related to the number of bits in the DAI field in the DCI. An MSB is a most significant bit, and an LSB is a least significant bit.

TABLE 1

| DAI field MSB, LSB | $V_{T-DAI,m}$ or $V_{C-DAI,c,m}$ | Y |
|---|---|---|
| 0, 0 | 1 | (Y − 1) mod 4 + 1 = 1 |
| 0, 1 | 2 | (Y − 1) mod 4 + 1 = 2 |
| 1, 0 | 3 | (Y − 1) mod 4 + 1 = 3 |
| 1, 1 | 4 | (Y − 1) mod 4 + 1 = 4 |

For example, if C-DAI or T-DAI is 1, 5, or 9, as shown in Table 1, the DAI field is indicated by "00", and the value of $V_{T-DAI,m}$ or $V_{C-DAI,c,m}$ is expressed as "1" by the equation in Table 1. Y may represent the value of the DAI (the value of the DAI before transformation by the equations in the table) corresponding to the number of DCIs actually transmitted by the base station.

For example, in the case where C-DAI or T-DAI in the DCI is 1 bit, a value greater than 2 may be expressed by the equation in Table 2.

TABLE 2

| DAI field | $V_{T-DAI,m}$ or $V_{C-DAI,c,m}$ | Y |
|---|---|---|
| 0 | 1 | (Y − 1) mod 2 + 1 = 1 |
| 1 | 2 | (Y − 1) mod 2 + 1 = 2 |

It should be noted that, unless otherwise clearly indicated by the context, all or one or more of the methods, steps or operations according to the embodiments of the disclosure may be specified by protocols and/or configured by higher layer signaling and/or indicated by dynamic signaling. The dynamic signaling may be DCI/PDCCH. For example, for an SPS PDSCH and/or a CG PUSCH, it may be dynamically indicated in activating DCI/DCI format/PDCCH. All or one or more of the described methods, steps and operations may be optional. For example, if a parameter (e.g., parameter X) is configured, the UE performs approach A, otherwise (if the parameter, e.g., parameter X, is not configured), the UE performs approach B.

It should be noted that, a Primary Cell (PCell) or a Primary Secondary Cell (PSCell) in embodiments of the disclosure may be used interchangeably with a Cell having a PUCCH.

It should be noted that, methods for downlink in embodiments of the disclosure may also be applicable to uplink, and methods for uplink may also be applicable to downlink. For example, a PDSCH may be replaced with a PUSCH, an SPS PDSCH may be replaced with a CG PUSCH, and a downlink symbol may be replaced with an uplink symbol, so that methods for downlink may be applicable to uplink.

It should be noted that, methods applicable to multiple PDSCHs/PUSCHs scheduling in embodiments of the disclosure may also be applicable to a PDSCH/PUSCH transmission with repetitions. For example, a PDSCH/PUSCH of multiple PDSCHs/PUSCHs may be replaced by a repetition of multiple repetitions of the PDSCH/PUSCH transmission.

In the method of the disclosure, being configured and/or indicated with a transmission with repetitions may be understood as that the number of transmissions with repetitions is greater than 1 For example, the "being configured and/or indicated with a transmission with repetitions" may be replaced with "PUCCH that is repeatedly transmitted in more than one slot/sub-slot". Being not configured and/or indicated with a transmission with repetitions may be understood as that the number of transmissions with repetitions is equal to 1. For example, "PUCCH that is not configured and/or indicated with a transmission with repetitions" may be replaced with "PUCCH transmission of which the number of transmissions with repetitions is equal to 1". For example, the UE may be configured with parameter $N_{PUCCH}^{repeat}$ associated with the number of PUCCH transmissions with repetitions; when the parameter $N_{PUCCH}^{repeat}$ is greater than 1, it may mean that the UE is configured with a PUCCH transmission with repetitions, and the UE may repeat PUCCH transmission on $N_{PUCCH}^{repeat}$ time units (e.g., slots); when the parameter is equal to 1, it may means that the UE is not configured with a PUCCH transmission with repetitions. For example, the PUCCH of transmission with repetitions may contain only one type of UCI. If the PUCCH is configured with a transmission with repetitions, then in the embodiment of the disclosure, a repetition of multiple repetitions of the PDSCH/PUSCH transmission may be taken as one PUCCH (or one PUCCH resource), or, all PUCCH transmissions with repetitions are taken as one PUCCH (or one PUCCH resource), or, a specific repetition of multiple repetitions of the PDSCH/PUSCH transmission is taken as one PUCCH (or one PUCCH resource).

It should be noted that, in methods of the disclosure, a PDCCH and/or DCI and/or DCI format schedules multiple PDSCHs/PUSCHs, which may be multiple PDSCHs/PUSCHs of a same serving cell and/or multiple PDSCHs/PUSCHs of different serving cells.

It should be noted that, modes as described in the disclosure may be combined in any order. In a combination, one mode may be executed one or more times.

It should be noted that, steps of methods of the method may be implemented in any order.

It should be noted that, in methods of the disclosure, "canceling a transmission" may mean canceling the transmission of the entire uplink channel and/or cancel the transmission of a part of the uplink channel.

It should be noted that, in methods of the disclosure, "an order from small to large" (e.g., an "ascending order") may be replaced by "an order from large to small" (e.g., a "descending order"), and/or "an order from large to small" (e.g., a "descending order") may be replaced by "an order from small to large" (e.g., an "ascending order").

It should be noted that, in methods of the disclosure, a PUCCH/PUSCH carrying A may be understood as a PUCCH/PUSCH only carrying A, and may also be understood as a PUCCH/PUSCH including at least A.

It should be noted that, in the embodiment of the disclosure, the term "slot" may be replaced with "sub-slot" or "time unit".

It should be noted that, in the embodiment of the disclosure, the expression "at least one" may be understood as "one" or "a plurality". With respect to a case of "a plurality", it may be arbitrary arrangement and combination. For example, at least one of "A", "B", "C" may be: "A", "B", "C", "AB", "BA", "ABC", "CBA", "ABCA", "ABCCB", etc.

When downlink data received by multiple users are the same, the base station may transmit a multicast/broadcast PDSCH. With respect to periodic services, the base station may also transmit multicast/broadcast SPS PDSCH(s). With respect to multicast/broadcast PDSCH(s), the UE may feed back HARQ-ACK thereof. How to configure the mode of HARQ-ACK feedback of multicast/broadcast PDSCH(s), how to configure the available PUCCH resource for with HARQ-ACK of multicast/broadcast PDSCH(s), how to determine the PUCCH resource for carrying HARQ-ACK of multicast/broadcast PDSCH(s), and how to multiplex and/or prioritize when the PUCCH with HARQ-ACK of multicast/broadcast PDSCH(s) overlapping with HARQ-ACK of unicast PDSCH(s), SR, CSI, or a PUSCH in time domain are problems to be solved.

In some embodiments, the mode of HARQ-ACK feedback of a multicast/broadcast PDSCH may be at least one of the modes below.

Mode 1: a mode of transmitting acknowledgement (ACK)/negative acknowledgement (NACK), that is, the UE receives a multicast/broadcast PDSCH; if decoding is correct, the UE transmits ACK; if decoding fails, the UE transmits NACK.

Mode 2: a mode of transmitting NACK-only, that is, the UE receives a multicast/broadcast PDSCH; if decoding is correct, the UE does not transmit HARQ-ACK information; and if decoding fails, the UE transmits NACK.

Mode 3: a mode of not transmitting HARQ-ACK, that is, the UE receives a multicast/broadcast PDSCH; and no matter whether decoding is correct, the UE does not transmit HARQ-ACK information.

The mode of HARQ-ACK feedback of multicast/broadcast PDSCH(s) may be specified in a standard and/or configured via higher layer signaling. For example, the mode of HARQ-ACK feedback may be configured uniformly for all multicast/broadcast PDSCHs, for example, it may be configured in the multicast/broadcast PUCCH configuration parameter. For another example, the mode of HARQ-ACK feedback may be configured separately for each multicast/broadcast PDSCH configuration, for example, it may be configured in multicast/broadcast PDSCH(s) configuration parameter. For another example, the mode of HARQ-ACK feedback may be configured for available HARQ processes/HARQ process groups of each multicast/broadcast PDSCH. For another example, the mode of HARQ-ACK feedback and/or PUCCH resources/PUCCH resource sets may be configured separately for each multicast/broadcast SPS PDSCH configuration, for example, it may be configured in multicast/broadcast SPS PDSCH configuration(s) parameter. At this time, the HARQ-ACK codebook of multicast/broadcast SPS PDSCH(s) may be determined according to at least one of the following set/configuration, that is, the UE generates the HARQ-ACK codebook only for a specific set/configuration. For example, the HARQ-ACK codebook is generated according to a pseudocode of the HARQ-ACK of the SPS PDSCHs in the existing standard (for example, 3GPP TS38.213), and the SPS PDSCH configuration in the pseudocode may be replaced with the set/configuration determined according to the disclosure.

set/configuration 1: configurations of all the first service SPS PDSCH;

set/configuration 2: configuration of the first service SPS PDSCH configured with transmitting HARQ-ACK;

set/configuration 3: configuration of the first service SPS PDSCH configured with transmitting ACK/NACK; and set/configuration 4: configuration of the first service SPS PDSCH configured with transmitting ACK/NACK and/or transmitting NACK-only.

For another example, the mode of HARQ-ACK feedback of PDSCH associated therewith may be configured separately for Control-Resource set (CORESET)/Search space/antenna port/TRP of each multicast/broadcast.

For another example, the mode of HARQ-ACK feedback may be configured separately for initial transmission and retransmission of multicast/broadcast PDSCH(s).

For another example, the mode of HARQ-ACK feedback of a multicast/broadcast PDSCH may be dynamically indicated by a DCI.

With respect to different modes of HARQ-ACK feedback of multicast/broadcast PDSCH(s), configuration(s)/resource(s) of the PUCCH with HARQ-ACK of multicast/broadcast PDSCH(s) may be the same or different.

In some implementations, it can be specified in a standard and/or configured via higher layer signaling that the multicast/broadcast PUCCH resource may be configured in a unicast PUCCH configuration parameter (for example, the 3GPP parameter PUCCH-Config).

For example, the HARQ-ACK PUCCH resource configuration of unicast PDSCH(s) may be reused. Or, an available PUCCH resource may be separately configured for the HARQ-ACK of multicast/broadcast PDSCH(s).

In some implementations, a specific multicast/broadcast PUCCH configuration parameter may also be specified in a standard and/or configured via higher layer signaling. Available PUCCH resources may be separately configured for the HARQ-ACK of multicast/broadcast PDSCH(s).

For example, the method for determining the PUCCH resource of the HARQ-ACK of unicast PDSCH(s) defined in 3GPP TS 38.213 may be reused to determine the PUCCH resource of the HARQ-ACK of multicast/broadcast PDSCH(s).

In some implementations, it can be specified in a standard and/or configured via higher layer signaling to separately determine the PUCCH resource for the HARQ-ACK of unicast PDSCH(s) and the HARQ-ACK of multicast/broadcast PDSCH(s).

For example, for dynamically scheduled multicast/broadcast PDSCH(s), a PUCCH set for HARQ-ACK of dynamically scheduled multicast/broadcast PDSCH(s) is determined according to the number of bits of HARQ-ACK of multicast/broadcast PDSCH(s) that feed back the HARQ-ACK information in a same PUCCH time unit; and a PUCCH resource from the PUCCH set is determined according to the PUCCH Resource Indicator (PRI) in the DCI (for example, the last DCI) of dynamically scheduled multicast/broadcast PDSCH(s). For multicast/broadcast PDSCH(s) without scheduling DCI/PDCCH (for example, SPS PDSCH), the PUCCH with HARQ-ACK of multicast/broadcast PDSCH(s) is determined according to the number of bits of HARQ-ACK of multicast/broadcast PDSCH(s) that feeds back the HARQ-ACK information in the same PUCCH time unit. In addition, the PUCCH with HARQ-ACK according to the disclosure may also be a PUCCH resource. It may be specified in a standard that the UE does not expect that the PUCCH resource with HARQ-ACK of multicast/broadcast PDSCH(s) and the PUCCH resource with HARQ-ACK of unicast PDSCH(s) are the same PUCCH resource. Or, if the PUCCH resource with HARQ- ACK of multicast/broadcast PDSCH(s) and the PUCCH resource with HARQ-ACK of unicast PDSCH(s) are the same PUCCH resource, the UE will re-determine the PUCCH resource according to the sum of the number of bits of HARQ-ACK of multicast/broadcast PDSCH(s) and the HARQ-ACK of unicast PDSCH(s).

For another example, if the mode of HARQ-ACK feedback of multicast/broadcast PDSCH(s) (or multicast/broadcast SPS PDSCH configuration(s)) is transmitting NACK-only, a specific PUCCH resource may be configured for multicast/broadcast PDSCH(s) (or multicast/broadcast SPS PDSCH configuration(s)), or a specific PUCCH resource set is configured for multicast/broadcast PDSCH(s). The UE may use the configured specific PUCCH resource and/or the specific PUCCH resource set to separately feed back HARQ-ACK information for each multicast/broadcast PDSCH (or multicast/broadcast SPS PDSCH). The UE may feed back more than one PUCCH with HARQ-ACK (for example, PUCCH resources without overlapping) in a PUCCH time unit. It may be specified in a standard that the UE separately determines a PUCCH resource for HARQ-ACK information of each multicast/broadcast PDSCH (or multicast/broadcast SPS PDSCH configuration), for example, in the time unit of HARQ-ACK transmission, a PUCCH resource is determined in a specific PUCCH resource set configured for multicast/broadcast PDSCH(s) (or multicast/broadcast SPS PDSCH configuration(s)) according to the PRI indication and/or the number of bits of HARQ-ACK. For another example, the HARQ-ACK information is 1 bit NACK; and in the time unit of HARQ-ACK transmission, a PUCCH resource is determined in the specific PUCCH resource set configured for multicast/broadcast PDSCH(s) (or multicast/broadcast SPS PDSCH configuration(s)) according to the PRI indication.

For another example, the specific PUCCH time unit (for example, a sub-slot length. For another example, a subcarrier spacing (SCS) numerology. For another example, a SCS numerology and a sub-slot length) may be configured for multicast/broadcast PDSCH(s) (or multicast/broadcast SPS PDSCH configuration(s)). For multicast/broadcast PDSCH(s) (for example, PDSCH(s) that only feed back NACK) (or multicast/broadcast SPS PDSCH configuration(s)), the UE determines the time unit which contains the PUCCH according to the specific PUCCH time unit and parameter K1.

For another example, a same PUCCH resource/resource set may be configured for the HARQ-ACK information of dynamically scheduled multicast/broadcast PDSCH(s) and/or multicast/broadcast SPS PDSCH(s).

In some implementations, it can be specified in a standard and/or configured via higher layer signaling to use a unified mode to determine the PUCCH resource for the HARQ-ACK of unicast PDSCH(s) and/or the HARQ-ACK of multicast/broadcast PDSCH(s).

For example, for dynamically scheduled multicast/broadcast PDSCH(s) and/or unicast PDSCH(s), a PUCCH set for HARQ-ACK of dynamically scheduled PDSCH(s) is determined according to the number of bits of HARQ-ACK of multicast/broadcast PDSCH(s) and/or unicast PDSCH(s) that feed back the HARQ-ACK information in the same PUCCH time unit; and a PUCCH resource from the PUCCH set is determined according to the PRI in the DCI of the dynamically scheduled PDSCH (for example, the DCI may be the DCI for scheduling a multicast/broadcast PDSCH and/or the last DCI for scheduling a unicast PDSCH, or, the DCI may be the last DCI for scheduling a unicast PDSCH). For multicast/broadcast PDSCH(s) and/or unicast PDSCH(s) without scheduling DCI/PDCCH (for example, SPS PDSCH(s)), the PUCCH with HARQ-ACK of the SPS PDSCHs is determined according to the number of bits of HARQ-ACK of the PDSCHs that feed back the HARQ-ACK information in the same PUCCH time unit.

This method provides multiple methods for configuring and determining the available PUCCH resources with HARQ-ACK of multicast/broadcast PDSCH(s), clarifies UE behavior, and can improve reliability of uplink control information transmission. Using different methods can improve flexibility of scheduling.

In some implementations, if the mode of HARQ-ACK feedback of multicast/broadcast PDSCH(s) (or multicast/broadcast SPS PDSCH(s)) is configured with transmitting NACK-only, when a PUCCH with HARQ-ACK (NACK) of multicast/broadcast PDSCH(s) (or multicast/broadcast PDSCH(s)) and a PUCCH with an SR overlap in the time domain, it can be specified in a standard and/or configured via higher layer signaling to transmit the PUCCH with HARQ-ACK (NACK) of multicast/broadcast PDSCH(s) (or multicast/broadcast PDSCH(s)) and not to transmit the PUCCH with an SR; or, to transmit the PUCCH with an SR and not to transmit the PUCCH with HARQ-ACK (NACK) of multicast/broadcast PDSCH(s) (or multicast/broadcast PDSCH(s)).

In some implementations, when a PUCCH with HARQ-ACK of multicast/broadcast PDSCH(s) (or multicast/broadcast SPS PDSCH(s)) and a PUCCH with an SR overlap in the time domain, it can be specified in a standard and/or configured via higher layer signaling to multiplex the HARQ-ACK of multicast/broadcast PDSCH(s) (or multicast/broadcast SPS PDSCH(s)) and the SR in one PUCCH (for example, the PUCCH resource with the HARQ-ACK).

It should be noted that, UE behavior in different configurations/scenarios (for example, PUCCH format, whether SR is positive SR or negative SR, HARQ-ACK feedback mode) may be different.

In some implementations, when a PUCCH with HARQ-ACK of multicast/broadcast PDSCH(s) (or multicast/broadcast SPS PDSCH(s)) and a PUCCH with CSI overlap in the time domain, it can be specified in a standard and/or configured via higher layer signaling to transmit the PUCCH with HARQ-ACK of multicast/broadcast PDSCH(s) (or multicast/broadcast SPS PDSCH(s)) and not to transmit the PUCCH with CSI; or to transmit the PUCCH with CSI and not to transmit the PUCCH with HARQ-ACK of multicast/broadcast PDSCH(s) (or multicast/broadcast SPS PDSCH(s)); or to multiplex the HARQ-ACK of multicast/broadcast PDSCH(s) (or multicast/broadcast SPS PDSCH(s)) and the CSI in a PUCCH (for example, the PUCCH resource of the CSI). For example, the 3GPP parameter simultaneousHARQ-ACK-CSI may be reused or a new parameter may be used to configure whether a PUCCH with HARQ-ACK of multicast/broadcast PDSCH(s) (or multicast/broadcast SPS PDSCH(s)) and a PUCCH with CSI may be simultaneously transmitted. If the parameter is configured, the HARQ-ACK of multicast/broadcast PDSCH(s) (or multicast/broadcast SPS PDSCH(s)) and the CSI may be multiplexed in one PUCCH, otherwise, only the PUCCH with HARQ-ACK of multicast/broadcast PDSCH(s) (or multicast/broadcast SPS PDSCH(s)) is transmitted, or only the PUCCH with CSI is transmitted. It should be noted that, this method is also applicable to a scenario where a PUCCH with HARQ-ACK of multicast/broadcast PDSCH(s) (or multicast/broadcast SPS PDSCH(s)), a PUCCH with CSI, and a PUCCH with an SR overlap in the time domain.

In some cases, the mode of HARQ-ACK feedback of multicast/broadcast PDSCH(s) may be configured by higher layer signaling as transmitting NACK-only; and when a PUCCH with HARQ-ACK of multicast/broadcast PDSCH(s) and a PUCCH with CSI and/or SR overlap in time domain, the HARQ-ACK of multicast/broadcast PDSCH(s) and the CSI and/or SR may be multiplexed in one PUCCH resource for carrying CSI. Since the number of bits that a PUCCH for carrying HARQ-ACK of the multicast/broadcast PDSCH(s) can carry is limited, multiplexing in the PUCCH resource for carrying CSI may avoid a case where the number of bits of the UCI is greater than the number of bits that the PUCCH can carry, thereby improving reliability of uplink transmission.

In some cases, the feedback mode of HARQ-ACK of the multicast/broadcast PDSCH(s) may be configured by higher layer signaling as transmitting NACK-only; and when the number of bits of HARQ-ACK is more than 1 bit (e.g., multiplexing the HARQ-ACK of more than one PDSCH in a PUCCH), two HARQ-ACK multiplexing modes may be configured by higher layer signaling.

Multiplexing mode I: converting HARQ-ACK information into a mode of ACK/NACK (Mode 1), and using a PUCCH resource for the mode of ACK/NACK to carry the HARQ-ACK information.

Multiplexing mode II: determining a PUCCH resource according to the HARQ-ACK information to carry HARQ-ACK information. For example, it may be determined according to Table 3 or Table 4. The corresponding PUCCH resource index is determined via HARQ-ACK and then the corresponding PUCCH resource is transmitted.

TABLE 3

| PUCCH resource index | HARQ-ACK | | | |
|---|---|---|---|---|
| | 1 bit | 2 bits | 3 bits | 4 bits |
| 0 | NACK | NACK, NACK | NACK, NACK, NACK | NACK, NACK, NACK, NACK |
| 1 | | ACK, NACK | ACK, NACK, NACK | ACK, NACK, NACK, NACK |
| 2 | | NACK, ACK | NACK, ACK, NACK | NACK, ACK, NACK, NACK |
| 3 | | | NACK, NACK, ACK | NACK, NACK, ACK, NACK |
| 4 | | | ACK, ACK, NACK | ACK, ACK, NACK, NACK |
| 5 | | | ACK, NACK, ACK | ACK, NACK, ACK, NACK |
| 6 | | | NACK, ACK, ACK | NACK, ACK, ACK, NACK |
| 7 | | | | NACK, NACK, NACK, ACK |
| 8 | | | | ACK, NACK, NACK, ACK |
| 9 | | | | NACK, ACK, NACK, ACK |
| 10 | | | | NACK, NACK, ACK, ACK |
| 11 | | | | ACK, ACK, NACK, ACK |
| 12 | | | | ACK, NACK, ACK, ACK |
| 13 | | | | NACK, ACK, ACK, ACK |
| 14 | | | | ACK, ACK, ACK, NACK |

TABLE 4

| PUCCH resource index | HARQ-ACK |
|---|---|
| 0 | NACK |
| 1 | NACK, NACK |
| 2 | ACK, NACK |
| 3 | NACK, ACK |
| 4 | NACK, NACK, NACK |
| 5 | ACK, NACK, NACK |
| 6 | NACK, ACK, NACK |
| 7 | NACK, NACK, ACK |
| 8 | ACK, ACK, NACK |
| 9 | ACK, NACK, ACK |
| 10 | NACK, ACK, ACK |
| 11 | NACK, NACK, NACK, NACK |
| 12 | ACK, NACK, NACK, NACK |
| 13 | NACK, ACK, NACK, NACK |
| 14 | NACK, NACK, ACK, NACK |
| 15 | ACK, ACK, NACK, NACK |
| 16 | ACK, NACK, ACK, NACK |
| 17 | NACK, ACK, ACK, NACK |
| 18 | NACK, NACK, NACK, ACK |
| 19 | ACK, NACK, NACK, ACK |
| 20 | NACK, ACK, NACK, ACK |
| 21 | NACK, NACK, ACK, ACK |
| 22 | ACK, ACK, NACK, ACK |
| 23 | ACK, NACK, ACK, ACK |
| 24 | NACK, ACK, ACK, ACK |
| 25 | ACK, ACK, ACK, NACK |

It should be noted that, the corresponding relationship between the state of HARQ-ACK and the PUCCH resource index in Table 3 and/or Table 4 may be replaced by other mapping mode.

In some embodiments, when a PUCCH with HARQ-ACK of multicast/broadcast PDSCH(s) and a PUCCH with CSI and/or SR overlap in time domain, with respect to multiplexing mode II, the HARQ-ACK of multicast/broadcast PDSCH(s) and the CSI and/or SR may be multiplexed in a PUCCH resource for carrying CSI. With respect to multiplexing mode I, if the HARQ-ACK contains the HARQ-ACK of a PDSCH scheduled by a DCI, the HARQ-ACK of the multicast/broadcast PDSCH(s) and the CSI and/or SR may be multiplexed in a PUCCH resource for carrying HARQ-ACK; and if the HARQ-ACK is the HARQ-ACK of SPS PDSCH(s), the HARQ-ACK of the multicast/broadcast PDSCH(s) and the CSI and/or SR may be multiplexed in a PUCCH resource for carrying CSI.

With respect to multiplexing mode II, since the number of bits that a PUCCH for carrying HARQ-ACK of multicast/broadcast PDSCH(s) can carry is limited, multiplexing in the PUCCH resource for carrying CSI may avoid a case where the number of bits of the UCI is greater than the number of bits that the PUCCH can carry, thereby improving reliability of uplink transmission.

In some embodiments, when a PUCCH with HARQ-ACK of multicast/broadcast PDSCH(s) and a PUCCH with CSI and/or SR overlap in time domain, with respect to multiplexing mode II, the HARQ-ACK of multicast/broadcast PDSCH(s) and the CSI and/or SR may be multiplexed in a PUCCH resource for carrying HARQ-ACK with ACK/

NACK feedback. For example, a PUCCH resource carrying HARQ-ACK with ACK/NACK feedback may be a unicast PUCCH resource and/or a multicast/broadcast PUCCH resource.

In some embodiments, when a PUCCH with HARQ-ACK of multicast/broadcast PDSCH(s) and a PUCCH with CSI and/or SR overlap in time domain and the HARQ-ACK contains HARQ-ACK of a PDSCH scheduled by a DCI, with respect to multiplexing mode II, the HARQ-ACK of multicast/broadcast PDSCH(s) and the CSI and/or SR may be multiplexed in a PUCCH resource for carrying HARQ-ACK with ACK/NACK feedback. For example, a PUCCH resource carrying HARQ-ACK with ACK/NACK feedback may be a PUCCH resource carrying HARQ-ACK of unicast PDSCH(s) scheduled by DCI(s) and/or a PUCCH resource carrying HARQ-ACK of multicast/broadcast PDSCH(s) scheduled by DCI(s).

With respect to multiplexing mode II, since the number of bits that a PUCCH for carrying HARQ-ACK of multicast/broadcast PDSCH(s) can carry is limited, multiplexing in the PUCCH resource for carrying CSI may avoid a case where the number of bits of the UCI is greater than the number of bits that the PUCCH can carry, thereby improving reliability of uplink transmission.

In some implementations, if a PUCCH with HARQ-ACK of multicast/broadcast PDSCH(s) (for example, dynamically scheduled multicast/broadcast PDSCH(s) and/or SPS PDSCH(s)) and a PUCCH with HARQ-ACK of unicast PDSCH(s) (for example, dynamically scheduled unicast PDSCH(s) and/or SPS PDSCH) overlap in the time domain, it can be specified in a standard and/or configured via higher layer signaling to transmit the PUCCH with HARQ-ACK of unicast PDSCH(s) (for example, dynamically scheduled unicast PDSCH(s) and/or unicast SPS PDSCH(s)) and not to transmit the PUCCH with HARQ-ACK of multicast/broadcast PDSCH(s) (for example, dynamically scheduled multicast/broadcast PDSCH(s) and/or multicast/broadcast SPS PDSCH(s)); or, to the transmit the PUCCH with HARQ-ACK of multicast/broadcast PDSCH(s) (for example, dynamically scheduled multicast/broadcast PDSCH(s) and/or multicast/broadcast SPS PDSCH(s)) and not to transmit the PUCCH with HARQ-ACK of unicast PDSCH(s) (for example, dynamically scheduled unicast PDSCH(s) and/or unicast SPS PDSCH(s)); or, to multiplex the HARQ-ACK of multicast/broadcast PDSCH(s) (for example, dynamically scheduled multicast/broadcast PDSCH(s) and/or multicast/broadcast SPS PDSCH(s)) and the HARQ-ACK of unicast PDSCH(s) (for example, dynamically scheduled unicast PDSCH(s) and/or unicast SPS PDSCH(s)) in one PUCCH (for example, the PUCCH resource with HARQ-ACK of unicast PDSCH(s)). It should be noted that, this method is also applicable to a scenario where a PUCCH with HARQ-ACK of multicast/broadcast PDSCH(s) (or multicast/broadcast SPS PDSCH(s)), a PUCCH with HARQ-ACK of unicast PDSCH(s), and a PUCCH with an SR overlap in the time domain. It should be noted that, this method is also applicable to a scenario where a PUCCH the HARQ-ACK of multicast/broadcast PDSCH(s) (or multicast/broadcast SPS PDSCH(s)), a PUCCH with HARQ-ACK of unicast PDSCH(s), and a PUCCH with CSI overlap in the time domain. It should be noted that, this method is also applicable to a scenario where a PUCCH with HARQ-ACK of multicast/broadcast PDSCH(s) (or multicast/broadcast SPS PDSCH(s)), a PUCCH with HARQ-ACK of unicast PDSCH(s), a PUCCH with an SR, and the PUCCH with CSI overlap in the time domain.

This method specifies the rules for determining the PUCCH resource, clarifies UE behavior, ensures consistency of understanding between the UE and the base station, and improves reliability of PUCCH transmission.

In some implementations, if HARQ-ACK of multicast/broadcast PDSCH(s) and HARQ-ACK of unicast PDSCH(s) and/or CSI and/or SR are multiplexed in a PUCCH (for example, PUCCH format 2 and/or PUCCH format 3), priorities of different UCIs may be specified in a standard, and the UE maps the UCI information according to the priorities from high to low; if the physical resource block (PRB) of the PUCCH is limited (for example, when the number of bits determined by the product of the number of available resource elements (REs), the number of modulation orders, and the highest bit rate is less than the actual number of UCI bits), the UCI of a lower priority is dropped until the number of bits of UCIs actually transmitted is less than or equal to the number of bits determined by the product of the number of available REs, the number of modulation orders, and the highest bit rate. For example, the priority of the UCI from high to low may be: a HARQ-ACK of unicast PDSCH, a HARQ-ACK of multicast PDSCH, SR, Part 1 CSI, and Part 2 CSI. For another example, the priority of the UCI from high to low may be: a HARQ-ACK of unicast PDSCH, an SR, a HARQ-ACK of multicast PDSCH, Part 1 CSI, and Part 2 CSI. For another example, priority of the UCI from high to low be: a HARQ-ACK of unicast PDSCH, an SR, a HARQ-ACK of multicast PDSCH, Part 1 CSI, and Part 2 CSI. For another example, priority of the UCI from high to low may be: a HARQ-ACK of unicast PDSCH, an SR, Part 1 CSI, Part 2 CSI, and HARQ-ACK of multicast PDSCH. For another example, priority of the UCI from high to low may be: a HARQ-ACK of unicast PDSCH, an SR, Part 1 CSI, a HARQ-ACK of multicast PDSCH, and Part 2 CSI.

This method defines priorities of different UCIs; and when the PRB is limited, the UCI of the higher priority is transmitted preferentially, which improves reliability of transmission of the UCI of the higher priority. Retransmission of the downlink data due to HARQ-ACK error detection may be avoided, thereby improving the system's spectrum efficiency.

In some implementations, if a PUCCH with HARQ-ACK of multicast/broadcast PDSCH(s) (or multicast/broadcast SPS PDSCH(s)) and a PUCCH with HARQ-ACK of unicast PDSCH(s) and/or a PUCCH with an SR and/or a PUCCH with CSI overlap in the time domain, the HARQ-ACK of unicast PDSCH(s) and/or the SR and/or the CSI may be multiplexed in one PUCCH first; and if a PUCCH with HARQ-ACK of unicast PDSCH(s) and/or the SR and/or the CSI overlap with a PUCCH with HARQ-ACK of multicast/broadcast PDSCH(s) (or multicast/broadcast SPS PDSCH(s)) in time domain, the HARQ-ACK of multicast/broadcast PDSCH(s) (or multicast/broadcast SPS PDSCH(s)) and the HARQ-ACK of unicast PDSCH(s) and/or the SR and/or the CSI are multiplexed in one PUCCH.

In this way, it can be avoided a case that the SR and/or CSI cannot be multiplexed with the PUCCH with HARQ-ACK of multicast/broadcast PDSCH(s) (or multicast/broadcast SPS PDSCH(s)) such that the UCI is dropped, which improves the reliability of UCI transmission, and improves network system performance.

It should be noted that if more than one PUCCH with HARQ-ACK of multicast/broadcast PDSCH(s) overlap in time domain, the PUCCHs can be firstly multiplexed or prioritized to determine one PUCCH resource, and then it is determined whether the PUCCH overlaps with PUCCH with HARQ-ACK of a unicast PDSCH and/or PUCCH with an SR and/or PUCCH with CSI in time domain.

It should be noted that in the embodiments of the disclosure, the multiplexing or prioritization of multiple PUCCHs/PUSCHs needs to satisfy a certain timing relationship.

It should be noted that the multiplexing or prioritizing methods of multiple PUCCHs/PUSCHs in the embodiments of the disclosure are applicable to scenarios where the physical layer priorities of the PUCCH/PUSCHs are the same and/or the physical layer priorities are different.

In some implementations, if a PUCCH with HARQ-ACK of multicast/broadcast PDSCH(s) (or multicast/broadcast SPS PDSCH(s)) overlaps with a PUCCH with HARQ-ACK of unicast PDSCH(s) and/or a PUCCH with an SR and/or a PUCCH with CSI in time domain, it can be specified in a standard and/or configured via higher layer signaling that the PUCCH with HARQ-ACK of multicast/broadcast PDSCH(s) (or multicast/broadcast SPS PDSCH(s)) and the PUCCH with HARQ-ACK of unicast PDSCH(s) and/or the PUCCH with an SR and/or the PUCCH with CSI are transmitted simultaneously.

The method is simple to implement, can reduce the implementation complexity of UE, avoid dropping UCI information, and improve the reliability of UCI transmission.

It should be noted that the order of priority can also be defined for different UCIs for uplink power allocation, and the order of priority can be order of priority defined in other disclosed embodiments of the disclosure.

In some implementations, if a PUCCH with NACK-only (for example, NACK of multicast/broadcast PDSCH(s) (or multicast/broadcast SPS PDSCH(s))) overlaps with a PUCCH with transmitting ACK/NACK (for example, ACK/NACK of multicast/broadcast PDSCH(s) (or multicast/broadcast SPS PDSCH(s)) or unicast PDSCH(s)) in time domain, it can be specified in a standard and/or configured via higher layer signaling to only transmit the PUCCH with ACK/NACK, or the PUCCH with NACK-only, or to multiplex the PUCCH with NACK-only and the PUCCH with ACK/NACK in one PUCCH (for example, the PUCCH resource with ACK/NACK).

This method clarifies UE behavior when more than one PUCCH overlap in time domain, ensures the consistency of understanding between the UE and the base station, and improves the reliability of UCI information transmission.

In some implementations, if a PUCCH with HARQ-ACK of unicast PDSCH(s) of higher priority overlaps with a PUCCH with HARQ-ACK of multicast/broadcast PDSCH(s) of lower priority and HARQ-ACK of unicast PDSCH(s) of lower priority in time domain, it can be specified in a standard and/or configured via higher layer signaling to transmit the PUCCH with HARQ-ACK of unicast PDSCH(s) of the higher priority, but cancel/not transmit the PUCCH with HARQ-ACK of multicast/broadcast PDSCH(s) of the lower priority and HARQ-ACK of unicast PDSCH(s) of the lower priority; or to multiplex the HARQ-ACK of unicast PDSCH(s) of the higher priority and the HARQ-ACK of unicast PDSCH(s) of the lower priority in one PUCCH, but cancel/not transmit HARQ-ACK of multicast/broadcast PDSCH(s) of the lower priority; or to multiplex the HARQ-ACK of unicast PDSCH(s) of the higher priority, the HARQ-ACK of unicast PDSCH(s) of the lower priority, and the HARQ-ACK of multicast/broadcast PDSCH(s) of the lower priority in one PUCCH.

In some implementations, if a PUCCH with HARQ-ACK of multicast/broadcast PDSCH(s) of higher priority overlaps with a PUCCH with HARQ-ACK of multicast/broadcast PDSCH(s) of the lower priority and HARQ-ACK of unicast PDSCH(s) of the lower priority in time domain, it can be specified in a standard and/or configured via higher layer signaling to transmit the PUCCH with HARQ-ACK of multicast/broadcast PDSCH(s) of the higher priority, but cancel/not transmit the PUCCH with HARQ-ACK of multicast/broadcast PDSCH(s) of the lower priority and HARQ-ACK of unicast PDSCH(s) of the lower priority.

In some implementations, if a PUCCH with HARQ-ACK of unicast PDSCH(s) of the lower priority overlaps with a PUCCH with HARQ-ACK of multicast/broadcast PDSCH(s) of the higher priority and HARQ-ACK of unicast PDSCH(s) of the higher priority in time domain, it can be specified in a standard and/or configured via higher layer signaling to transmit the PUCCH with HARQ-ACK of multicast/broadcast PDSCH(s) of the higher priority and HARQ-ACK of unicast PDSCH(s) of the higher priority, but cancel/not transmit the PUCCH with HARQ-ACK of unicast PDSCH(s) of the lower priority; or to multiplex the HARQ-ACK of unicast PDSCH(s) of the lower priority, the HARQ-ACK of unicast PDSCH(s) of the higher priority, and the HARQ-ACK of multicast/broadcast PDSCH(s) of the higher priority in one PUCCH.

In some implementations, if a PUCCH with HARQ-ACK of multicast/broadcast PDSCH(s) of the lower priority overlaps with a PUCCH with HARQ-ACK of multicast/broadcast PDSCH(s) of the higher priority and HARQ-ACK of unicast PDSCH(s) of the higher priority in time domain, it can be specified in a standard and/or configured via higher layer signaling to transmit the PUCCH with HARQ-ACK of multicast/broadcast PDSCH(s) of the higher priority and HARQ-ACK of unicast PDSCH(s) of the higher priority, but cancel/not transmit the PUCCH with HARQ-ACK of unicast PDSCH(s) of the lower priority.

In some implementations, if a PUCCH with HARQ-ACK of unicast PDSCH(s) of the higher priority and HARQ-ACK of multicast/broadcast PDSCH(s) of the higher priority overlaps with a PUCCH with HARQ-ACK of multicast/broadcast PDSCH(s) of the lower priority and HARQ-ACK of unicast PDSCH(s) of the lower priority in time domain, it can be specified in a standard and/or configured via higher layer signaling to transmit the PUCCH with HARQ-ACK of unicast PDSCH(s) of the higher priority and HARQ-ACK of multicast/broadcast PDSCH(s) of the higher priority, but cancel/not transmit the PUCCH with HARQ-ACK of multicast/broadcast PDSCH(s) of the lower priority and HARQ-ACK of unicast PDSCH(s) of the lower priority; or to multiplex the HARQ-ACK of unicast PDSCH(s) of the higher priority, the HARQ-ACK of multicast/broadcast PDSCH(s) of the higher priority, and the HARQ-ACK of unicast PDSCH(s) of the lower priority in one PUCCH, but cancel/not transmit HARQ-ACK of multicast/broadcast PDSCH(s) of the lower priority.

In some implementations, if a PUCCH with HARQ-ACK of unicast PDSCH(s) of the lower priority and HARQ-ACK of unicast PDSCH(s) of the higher priority overlaps with a PUCCH with HARQ-ACK of multicast/broadcast PDSCH(s) of the lower priority in time domain, it can be specified in a standard and/or configured via higher layer signaling to transmit the PUCCH with HARQ-ACK of unicast PDSCH(s) of the lower priority and HARQ-ACK of unicast PDSCH(s) of the higher priority, but cancel/not transmit the PUCCH with HARQ-ACK of multicast/broadcast PDSCH(s) of the lower priority.

In some implementations, if a PUCCH with HARQ-ACK of unicast PDSCH(s) of the lower priority and HARQ-ACK of unicast PDSCH(s) of the higher priority overlaps with a PUCCH with HARQ-ACK of multicast/broadcast PDSCH(s) of the higher priority in time domain, it can be specified in a standard and/or configured via higher layer signaling to multiplex the HARQ-ACK of unicast PDSCH(s) of the higher priority and the HARQ-ACK of multicast/broadcast PDSCH(s) of the higher priority in one PUCCH, but cancel/not transmit the PUCCH with HARQ-ACK of unicast PDSCH(s) of the lower priority; or to multiplex the HARQ-ACK of unicast PDSCH(s) of the lower priority, the HARQ-ACK of unicast PDSCH(s) of the higher priority and the HARQ-ACK of multicast/broadcast PDSCH(s) of the higher priority in one PUCCH.

This method specifies UE behavior when two PUCCHs overlap in time domain, which ensures the consistency of understanding between the UE and the base station, and can improve the reliability of UCI information transmission. It should be noted that this method is also applicable to scenarios where PUSCH and PUCCH/PUSCH overlap in time domain. For example, PUCCH in the embodiment of the disclosure is replaced with PUCCH/PUSCH.

In some implementations, if more than two PUCCHs/PUSCHs overlap in time domain, it can be specified in a standard and/or configured via higher layer signaling the order of multiplexing or prioritization of each channel. For example, PUCCHs/PUSCHs of the same priority are multiplexed first, and then PUCCHs/PUSCHs of different priorities are multiplexed or prioritized. For another example, PUCCHs are multiplexed or prioritized first, and then PUCCHs and PUSCHs are multiplexed or prioritized. For another example, the same service type (unicast or multicast/broadcast) is multiplexed or prioritized first, and then different service types are multiplexed or prioritized.

In some implementations, if the UE is configured/indicated that the PUCCH with HARQ-ACK of unicast PDSCH(s) of the lower priority and the PUCCH with HARQ-ACK of unicast PDSCH(s) of the higher priority can be multiplexed in one PUCCH, the following steps are performed: the first step is to multiplex or prioritize the PUCCH of the higher priority and the PUCCH with HARQ-ACK of unicast PDSCH(s) of the lower priority. The second step is to multiplex or prioritize the PUCCH of the lower priority. For example, the PUCCHs that satisfy the conditions are put into a set, and then multiplexed or prioritized according to the method specified in 3GPP TS 38.213. The third step is to multiplex or prioritize PUCCHs of different priorities. It should be noted that the UCIs carried in PUCCHs in the second step are all UCIs of lower priority. In each step, the PUCCHs that satisfy the conditions are put into a set, and then multiplexed or prioritized according to the method specified in 3GPP TS 38.213.

This method specifies the order in which UCIs of different priorities are multiplexed and/or prioritized, clarifies UE behavior, and ensures the consistency of understanding between the UE and the base station, can improve the reliability of UCI information transmission, increase the probability of UCI transmission, and improve system efficiency.

Figure 8:
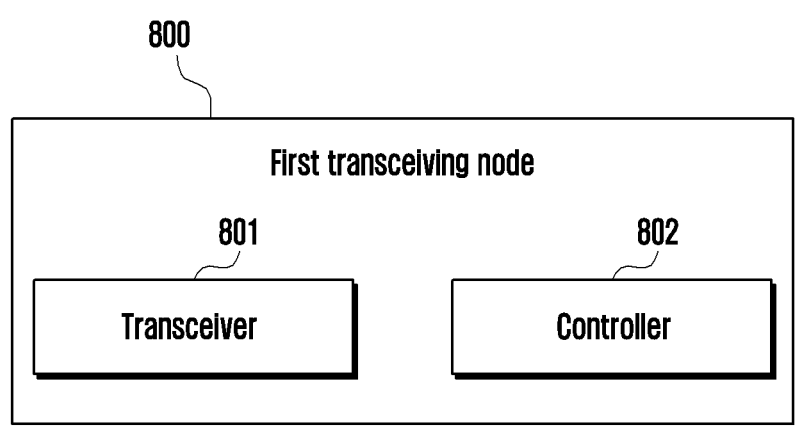
FIG. 8 illustrates a block diagram of a first transceiving node according to an embodiment of the disclosure.

FIG. 8 illustrates a block diagram of a first transceiving node 800 according to an embodiment of the disclosure.

Referring to FIG. 8, the first transceiving node 800 may include a transceiver 801 and a controller 802.

The transceiver 801 may be configured to transmit a first data and/or a first control signaling to a second transceiving node and receive a second data and/or a second control signaling from the second transceiving node during the time unit.

The controller 802 may be an Application Specific Integrated Circuit or at least one processor. The controller 802 may be configured to control the overall operation of the first transceiving node, including controlling the transceiver 801 to transmit the first data and/or the first control signaling to the second transceiving node and receive the second data and/or the second control signaling from the second transceiving node during the time unit; wherein the second data and/or the second control signaling is determined by the second transceiving node based on the first data and/or the first control signaling.

In some implementations, the controller 802 may be configured to perform one or more operations in the methods of the various embodiments described above.

In the following description, a base station is taken as an example (but not limited thereto) to illustrate the first transceiving node, a UE is taken as an example (but not limited thereto) to illustrate the second transceiving node. Downlink data and/or downlink control signaling (but not limited thereto) is used to illustrate the first data and/or the first control signaling. A HARQ-ACK codebook may be included in the second control signaling, and uplink control signaling (but not limited thereto) is used to illustrate the second control signaling.

Figure 9:
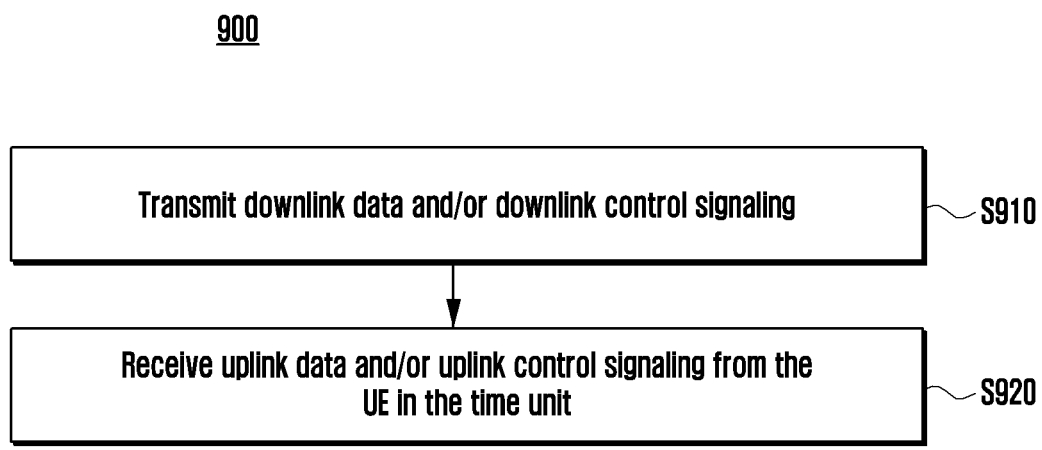
FIG. 9 illustrates a flowchart of a method performed by a base station according to an embodiment of the disclosure.

FIG. 9 illustrates a flowchart of a method 900 performed by a base station according to an embodiment of the disclosure.

Referring to FIG. 9, in operation S910, the base station transmits downlink data and/or downlink control signaling.

In operation S920, the base station receives uplink data and/or uplink control signaling from the UE during the time unit. Wherein the uplink data and/or uplink control signaling is determined by the UE based on the received downlink data and/or downlink control signaling.

For example, the method 900 may include one or more of the operations performed by the base station described in various embodiments of the disclosure.

In some implementations, the uplink channel includes a PUCCH or a PUSCH.

Those skilled in the art will understand that the above illustrative embodiments are described herein and are not intended to be limiting. It should be understood that any two or more of the embodiments disclosed herein may be combined in any combination. Furthermore, other embodiments may be utilized and other changes may be made without departing from the spirit and scope of the subject matter presented herein. It will be readily understood that aspects of the disclosure as generally described herein and shown in the drawings may be arranged, replaced, combined, separated and designed in various different configurations, all of which are contemplated herein.

Those skilled in the art will understand that the various illustrative logical blocks, modules, circuits, and steps described in this application may be implemented as hardware, software, or a combination of both. To clearly illustrate this interchangeability between hardware and software, various illustrative components, blocks, modules, circuits, and steps are generally described above in the form of their functional sets. Whether such function sets are implemented as hardware or software depends on the specific application and the design constraints imposed on the overall system. Technicians may implement the described functional sets in different ways for each specific application, but such design decisions should not be interpreted as causing a departure from the scope of this application.

The various illustrative logic blocks, modules, and circuits described in this application may be implemented or performed by a general purpose processor, a Digital Signal Processor (DSP), an Application Specific Integrated Circuit (ASIC), a Field Programmable Gate Array (FPGA) or other programmable logic devices, discrete gates or transistor logics, discrete hardware components, or any combination thereof designed to perform the functions described herein. The general purpose processor may be a microprocessor, but in an alternative, the processor may be any conventional processor, controller, microcontroller, or state machine. The processor may also be implemented as a combination of computing devices, such as a combination of a DSP and a microprocessor, a plurality of microprocessors, one or more microprocessors cooperating with a DSP core, or any other such configuration.

The steps of the method or algorithm described in this application may be embodied directly in hardware, in a software module executed by a processor, or in a combination thereof. The software module may reside in RAM memory, flash memory, ROM memory, EPROM memory, EEPROM memory, register, hard disk, removable disk, or any other form of storage medium known in the art. A storage medium is coupled to a processor to enable the processor to read and write information from/to the storage media. In an alternative, the storage medium may be integrated in the processor. The processor and the storage medium may reside in an ASIC. The ASIC may reside in a user terminal. In an alternative, the processor and the storage medium may reside in the user terminal as discrete components.

In one or more designs, the functions may be implemented in hardware, software, firmware, or any combination thereof. If implemented in software, each function may be stored as one or more pieces of instructions or codes on a computer-readable medium or delivered through it. The computer-readable medium includes both a computer storage medium and a communication medium, the latter including any medium that facilitates the transfer of computer programs from one place to another. The storage medium may be any available medium that can be accessed by a general purpose or special purpose computer.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a communication system, the method comprising:

receiving, from a base station, a radio resource control (RRC) message including first configuration information for a hybrid automatic repeat request (HARQ)-acknowledgement (ACK) feedback mode related to a multicast physical downlink shared channel (PDSCH) and second configuration information for a physical uplink control channel (PUCCH) resource configuration related to the HARQ-ACK feedback mode, wherein the HARQ-ACK feedback mode includes an ACK/negative-ACK (NACK) feedback mode or a NACK-only feedback mode, and the HARQ-ACK feedback mode is configured per multicast PDSCH configuration;

receiving, from the base station, the multicast PDSCH; and in case that the terminal has at least one of channel state information (CSI) or a scheduling request (SR), transmitting, to the base station, HARQ-ACK information for the multicast PDSCH in a first PUCCH resource or a second PUCCH resource, based on the NACK-only feedback mode being configured by the first configuration information, wherein the first PUCCH resource is used for reporting the CSI, and wherein the second PUCCH resource is identified by the second configuration information.

2. The method of claim 1, wherein the PUCCH resource configuration includes a first PUCCH resource configuration for the ACK/NACK feedback mode or a second PUCCH resource configuration for the NACK-only feedback mode, and wherein the multicast PDSCH includes a dynamically scheduled multicast PDSCH or a multicast semi-persistent scheduling (SPS) PDSCH without physical downlink control channel (PDCCH) scheduling.

3. The method of claim 1, further comprising:

generating the HARQ-ACK information for the multicast PDSCH with ACK information based on decoding of the multicast PDSCH being corrected, or with NACK information based on the decoding of the multicast PDSCH being failed, in case that the ACK/NACK feedback mode is configured based on the first configuration information; and generating the HARQ-ACK information for the multicast PDSCH with the NACK information based on the decoding of the multicast PDSCH being failed, in case that the NACK-only feedback mode is configured based on the first configuration information, wherein the HARQ-ACK information for the multicast PDSCH with the ACK information is not generated, based on the NACK-only feedback mode.

4. The method of claim 1, wherein, in case that the terminal has the SR, a third PUCCH resource used for reporting the SR and the second PUCCH resource overlap in time, and wherein the SR includes a positive SR.

5. The method of claim 1, further comprising:

in case that the terminal has the CSI and the multicast PDSCH is a multicast semi-persistent scheduling (SPS) PDSCH without physical downlink control channel (PDCCH) scheduling, multiplexing the HARQ-ACK information for the multicast SPS PDSCH without PDCCH scheduling with the CSI in the first PUCCH resource.

6. A method performed by a base station in a communication system, the method comprising:

transmitting, to a terminal, a radio resource control (RRC) message including first configuration information for a hybrid automatic repeat request (HARQ)-acknowledgement (ACK) feedback mode related to a multicast physical downlink shared channel (PDSCH) and second configuration information for a physical uplink control channel (PUCCH) resource configuration related to the HARQ-ACK feedback mode, wherein the HARQ-ACK feedback mode includes an ACK/negative-ACK (NACK) feedback mode or a NACK-only feedback mode, and the HARQ-ACK feedback mode is configured per multicast PDSCH;

transmitting, to the terminal, the multicast PDSCH; and in case that the terminal has at least one of channel state information (CSI) or a scheduling request (SR), receiving, from the terminal, HARQ-ACK information for the multicast PDSCH in a first PUCCH resource or a second PUCCH resource, based on the NACK-only feedback mode being configured by the first configuration information, wherein the first PUCCH resource is used for reporting the CSI, and wherein the second PUCCH resource is identified by the second configuration information.

7. The method of claim 6, wherein the PUCCH resource configuration includes a first PUCCH resource configuration for the ACK/NACK feedback mode or a second PUCCH resource configuration for the NACK-only feedback mode, and wherein the multicast PDSCH includes a dynamically scheduled multicast PDSCH or a multicast semi-persistent scheduling (SPS) PDSCH without physical downlink control channel (PDCCH) scheduling.

8. The method of claim 6, wherein in case that the ACK/NACK feedback mode is configured based on the first configuration information, the HARQ/ACK information for the multicast PDSCH includes ACK information and NACK information, and wherein, in case that the NACK-only feedback mode is configured based on the first configuration information, the HARQ/ACK information for the multicast PDSCH includes the NACK information.

9. The method of claim 6, wherein, in case that the terminal has the SR, a third PUCCH resource used for reporting the SR and the second PUCCH resource overlap in time, and wherein the SR includes a positive SR.

10. The method of claim 6, wherein, in case that the terminal has the CSI and the multicast PDSCH is a multicast semi-persistent scheduling (SPS) PDSCH without PDCCH scheduling, the HARQ-ACK information for the multicast SPS PDSCH without PDCCH scheduling and the CSI are multiplexed in the first PUCCH resource.

11. A terminal in a communication system, the terminal comprising:

a transceiver; and a controller coupled with the transceiver and configured to:

receive, from a base station, a radio resource control (RRC) message including first configuration information for a hybrid automatic repeat request (HARQ)-acknowledgement (ACK) feedback mode related to a multicast physical downlink shared channel (PDSCH) and second configuration information for a physical uplink control channel (PUCCH) resource configuration related to the HARQ-ACK feedback mode, wherein the HARQ-ACK feedback mode includes an ACK/negative-ACK (NACK) feedback mode or a NACK-only feedback mode, and the HARQ-ACK feedback mode is configured per multicast PDSCH, receive, from the base station, the multicast PDSCH, and in case that the terminal has at least one of channel state information (CSI) or a scheduling request (SR), transmit, to the base station, HARQ-ACK information for the multicast PDSCH in a first PUCCH resource or a second PUCCH resource, based on the NACK-only feedback mode being configured by the first configuration information, wherein the first PUCCH resource is used for reporting the CSI, and wherein the second PUCCH resource is identified by the second configuration information.

12. The terminal of claim 11, wherein the PUCCH resource configuration includes a first PUCCH resource configuration for the ACK/NACK feedback mode or a second PUCCH resource configuration for the NACK-only feedback mode, and wherein the multicast PDSCH includes a dynamically scheduled multicast PDSCH or a multicast semi-persistent scheduling (SPS) PDSCH without physical downlink control channel (PDCCH) scheduling.

13. The terminal of claim 11, wherein the controller is further configured to:

generate the HARQ-ACK information for the multicast PDSCH with ACK information based on decoding of the multicast PDSCH being corrected, or with NACK information based on the decoding of the multicast PDSCH being failed, in case that the ACK/NACK feedback mode is configured based on the first configuration information, and generate the HARQ-ACK information for the multicast PDSCH with the NACK information based on the decoding of the multicast PDSCH being failed, in case that the NACK-only feedback mode is configured based on the first configuration information, and wherein the HARQ-ACK information for the multicast PDSCH with the ACK information is not generated, based on the NACK-only feedback mode.

14. The terminal of claim 11, wherein, in case that the terminal has the SR, a third PUCCH resource used for reporting the SR and the second PUCCH resource overlap in time, and wherein the SR includes a positive SR.

15. The terminal of claim 11, wherein in case that the terminal has the CSI and the multicast PDSCH is a multicast semi-persistent scheduling (SPS) PDSCH without physical downlink control channel (PDCCH) scheduling, the controller is further configured to multiplex the HARQ-ACK information for the multicast SPS PDSCH without PDCCH scheduling with the CSI in the first PUCCH resource.

16. A base station in a communication system, the base station comprising:

a transceiver; and a controller coupled with the transceiver and configured to:

transmit, to a terminal, a radio resource control (RRC) message including first configuration information for a hybrid automatic repeat request (HARQ)-acknowledgement (ACK) feedback mode related to a multicast physical downlink shared channel (PDSCH) and second configuration information for a physical uplink control channel (PUCCH) resource configuration related to the HARQ-ACK feedback mode, wherein the HARQ-ACK feedback mode includes an ACK/negative-ACK (NACK) feedback mode or a NACK-only feedback mode, and the HARQ-ACK feedback mode is configured per multicast PDSCH, transmit, to the terminal, the multicast PDSCH, and in case that the terminal has at least one of channel state information (CSI) or a scheduling request (SR), receive, from station terminal, HARQ-ACK information for the multicast PDSCH in a first PUCCH resource or a second PUCCH resource, based on the NACK-only feedback mode being configured by the first configuration information, wherein the first PUCCH resource is used for reporting the CSI, and wherein the second PUCCH resource is identified by the second configuration information.

17. The base station of claim 16, wherein the PUCCH resource configuration includes a first PUCCH resource configuration for the ACK/NACK feedback mode or a second PUCCH resource configuration for the NACK-only feedback mode, and wherein the multicast PDSCH includes a dynamically scheduled multicast PDSCH or a multicast semi-persistent scheduling (SPS) PDSCH without physical downlink control channel (PDCCH) scheduling.

18. The base station of claim 16, wherein, in case that the ACK/NACK feedback mode is configured based on the first configuration information, the HARQ/ACK information for the multicast PDSCH includes ACK information and NACK information, and wherein, in case that the NACK-only feedback mode is configured based on the first configuration information, the HARQ/ACK information for the multicast PDSCH includes the NACK information.

19. The base station of claim 16, wherein, in case that the terminal has the SR, a third PUCCH resource used for reporting the SR and the second PUCCH resource overlap in time, and wherein the SR includes a positive SR.

20. The base station of claim 16, wherein, in case that the terminal has the CSI and the multicast PDSCH is a multicast semi-persistent scheduling (SPS) PDSCH without PDCCH scheduling, the HARQ-ACK information for the multicast SPS PDSCH without PDCCH scheduling and the CSI are multiplexed in the first PUCCH resource.

* * * * *